United States Patent [19]

Jakowicki

[11] Patent Number: 4,462,125
[45] Date of Patent: Jul. 31, 1984

[54] COPING AND DECK SYSTEM FOR A SWIMMING POOL

[76] Inventor: Henry Jakowicki, 123 Malts Ave., West Islip, N.Y. 11795

[21] Appl. No.: 161,366

[22] Filed: Jun. 20, 1980

Related U.S. Application Data

[63] Continuation-in-part of Ser. No. 859,253, Dec. 9, 1977, Pat. No. 4,249,273.

[51] Int. Cl.³ .............................................. E04H 3/18
[52] U.S. Cl. ......................................... 4/507; 4/506; 4/508; 4/510; 52/169.7; 52/309.1
[58] Field of Search ................... 4/506, 507, 494, 508, 4/191, 663, 509, 510, 511, 512; 52/169.7, 309.1, 300

[56] References Cited

U.S. PATENT DOCUMENTS

| | | | |
|---|---|---|---|
| 1,454,310 | 5/1923 | Booraem | 4/506 |
| 1,461,026 | 7/1923 | Booraem | 4/506 |
| 1,797,397 | 3/1931 | Booraem | 4/506 |
| 2,490,272 | 12/1949 | Kascle | 52/169.7 |
| 2,816,329 | 12/1957 | Sogaro | 52/309.1 |
| 3,015,191 | 1/1962 | Lucchesi | 4/507 X |
| 3,289,370 | 12/1966 | Van Etten | 52/309.1 |
| 3,386,107 | 6/1968 | Whitten | 4/508 |
| 3,585,656 | 6/1971 | Costello | 4/494 |
| 3,611,451 | 10/1971 | Armstrong | 4/663 |
| 3,821,818 | 7/1974 | Alosi | 4/191 |
| 3,839,748 | 10/1974 | Stillman | 52/300 |

*Primary Examiner*—Henry K. Artis
*Attorney, Agent, or Firm*—Posnack, Roberts, Cohen & Spiecens

[57] ABSTRACT

Collection apparatus for overflow water from a swimming pool comprising an overflow member at the side wall of the pool for flow of pool water thereover, and a flow receiving member extending outwardly from the overflow member for receiving overflow water therefrom. The flow receiving member is formed as a hollow element having upper and lower flanges and a longitudinal channel between the flanges. The upper flange serves as the pool deck surface and has openings therein for passage of water through the upper flange into the channel. The collected water flows through the channel to a surge tank located at a level below the channel and remote from the pool. The channel can be sub-divided and the flow of the water in the channel can be regulated by control elements according to various requirements for heating, cooling or leaving the water untreated, the heating or cooling being effected by solar energy. The construction can provide for the capability of elimination of the surge tank by storage of sufficient water in the flow receiving member. The construction is usable with a HVAC system for conditioning the air in indoor pools. It is also capable of use with vinyl liners. The flow receiving member can have a removable section which can be inverted to provide indicia changes or to alter the surface of the deck.

33 Claims, 62 Drawing Figures

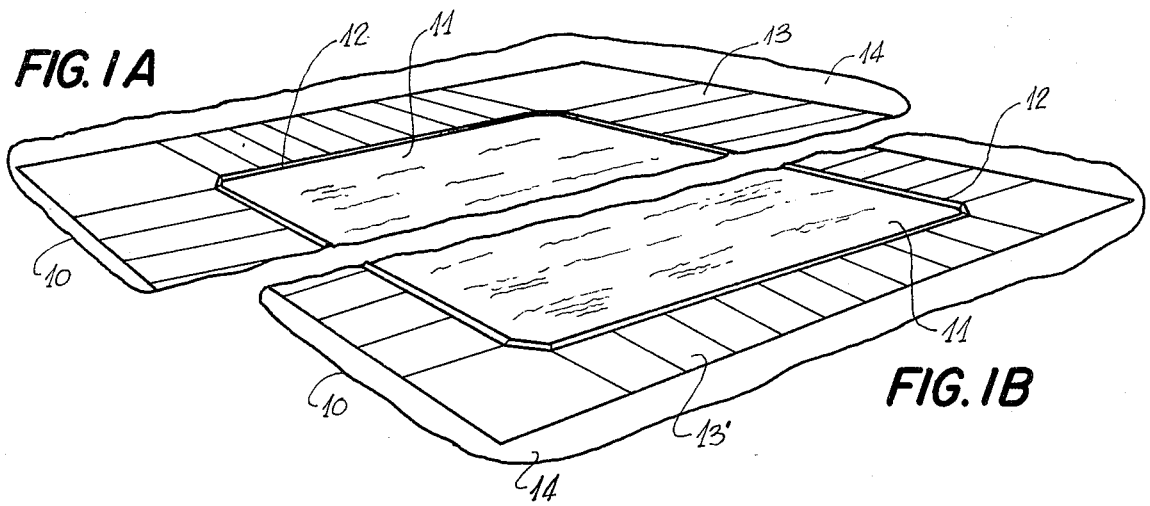
FIG. 1A
FIG. 1B
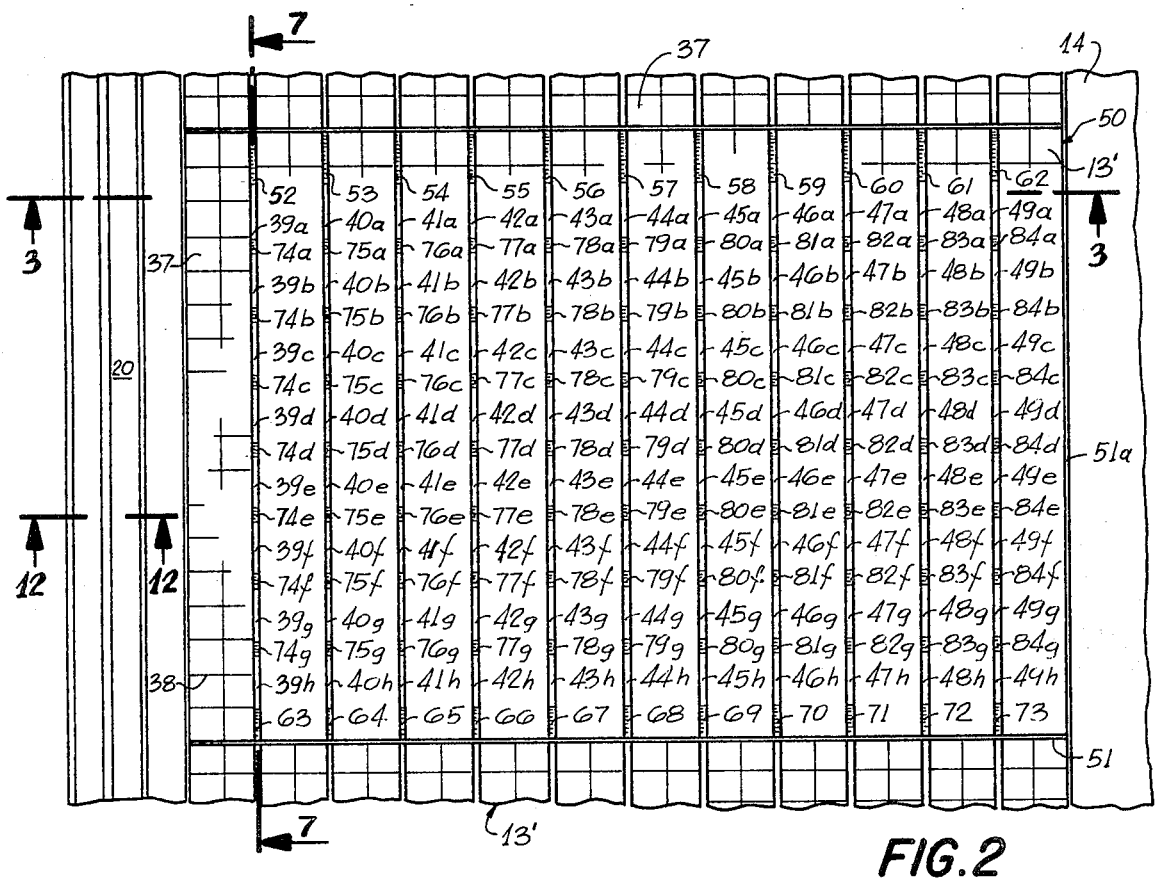
FIG. 2

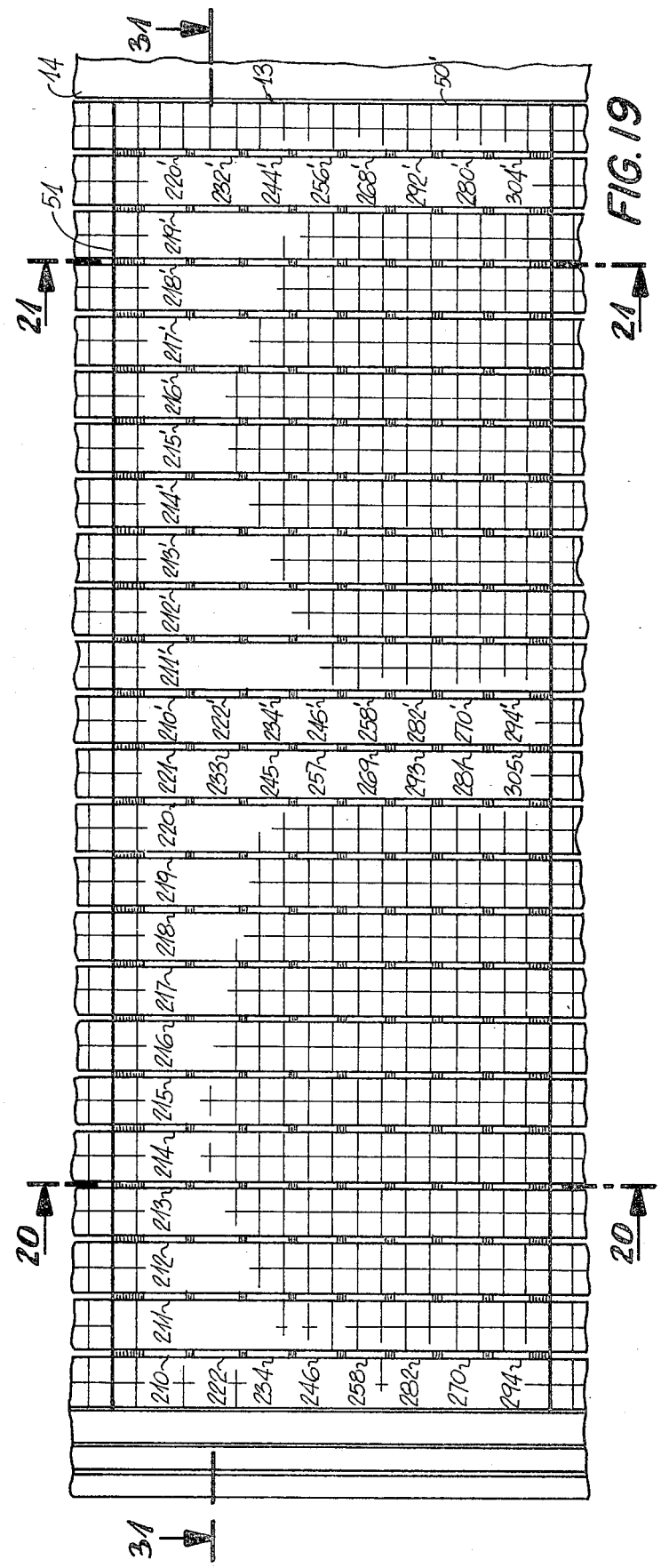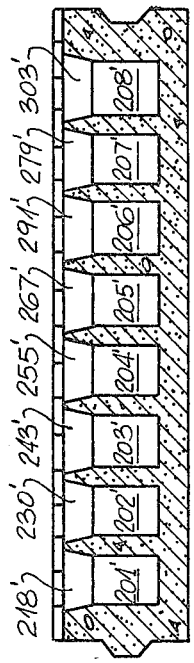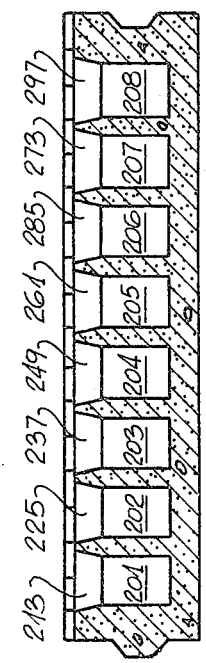

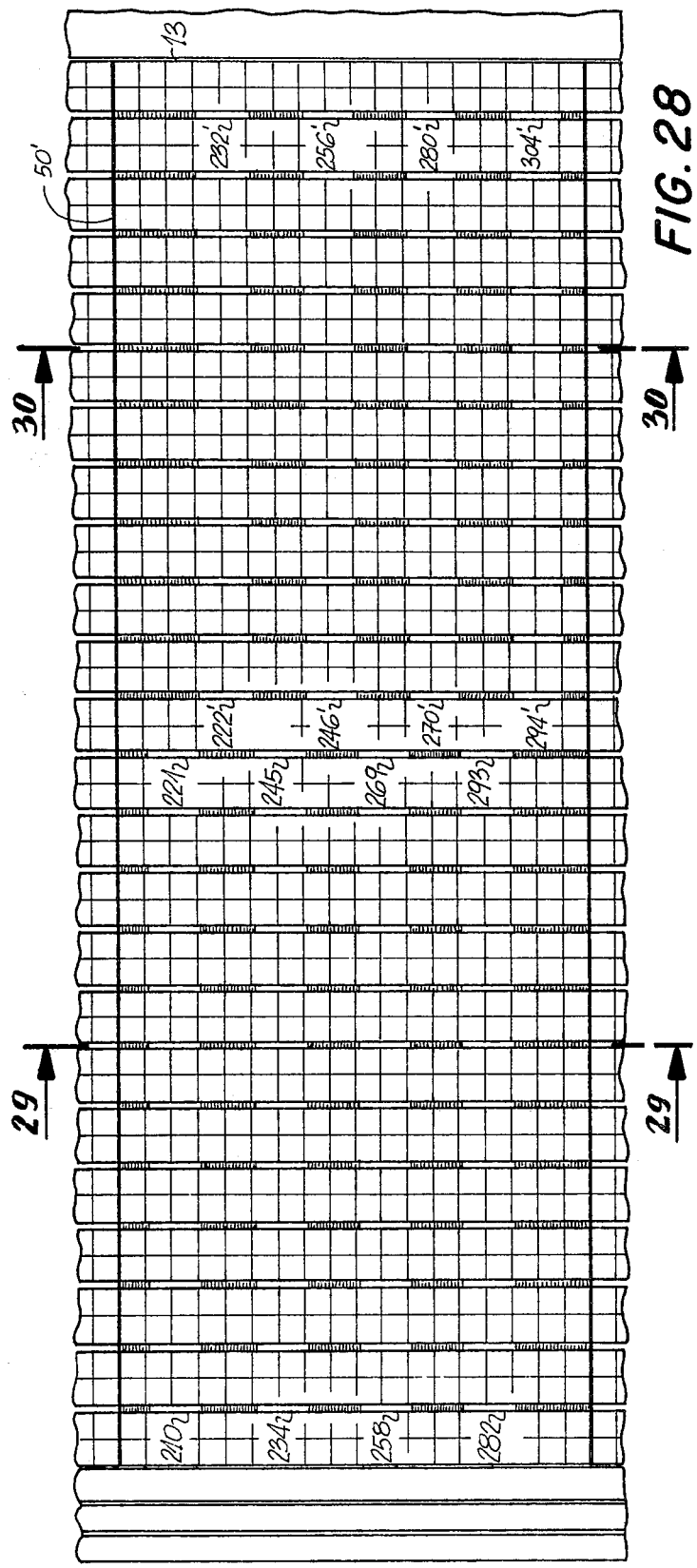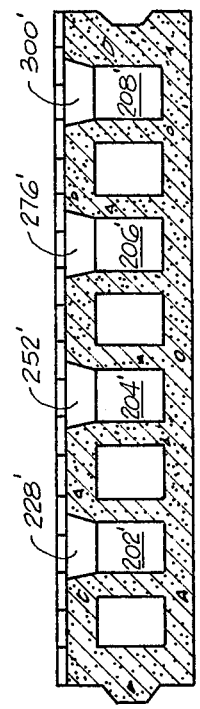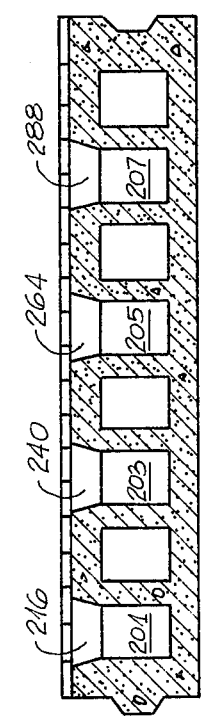

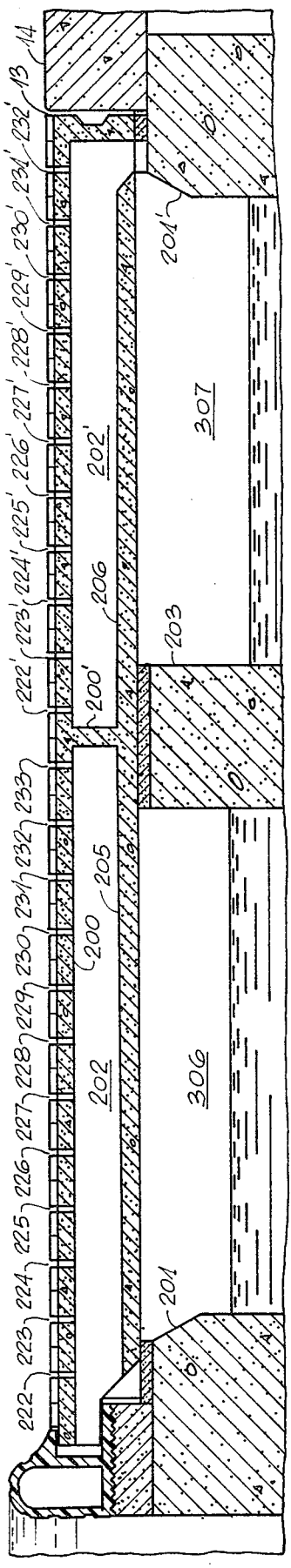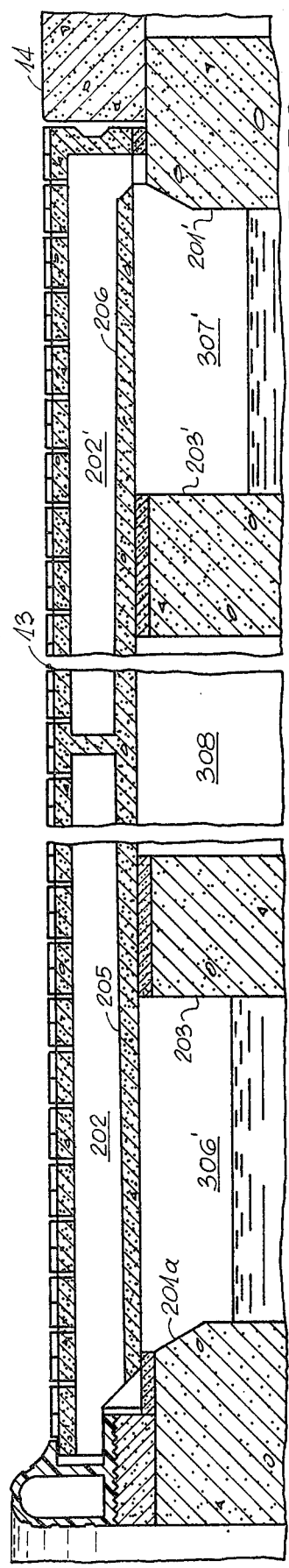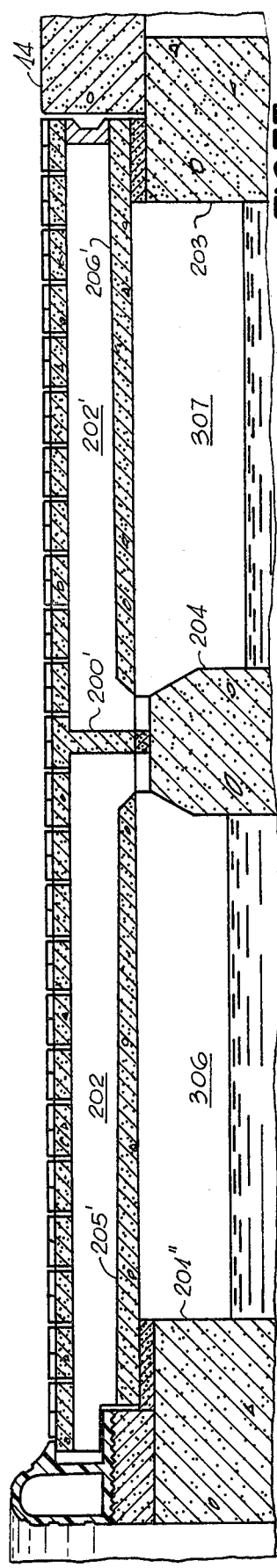

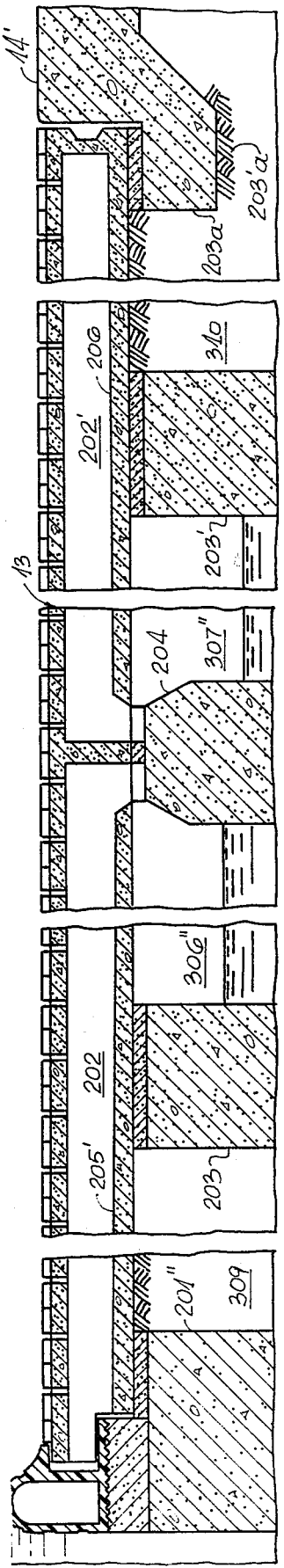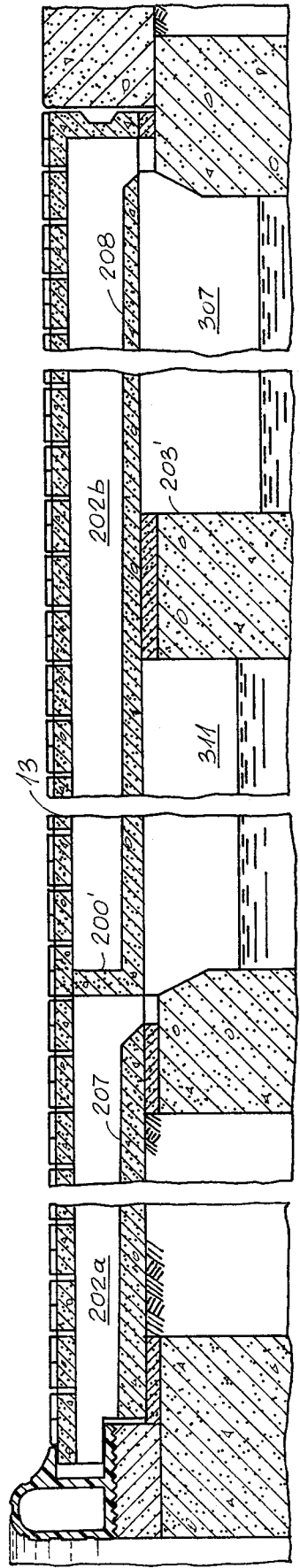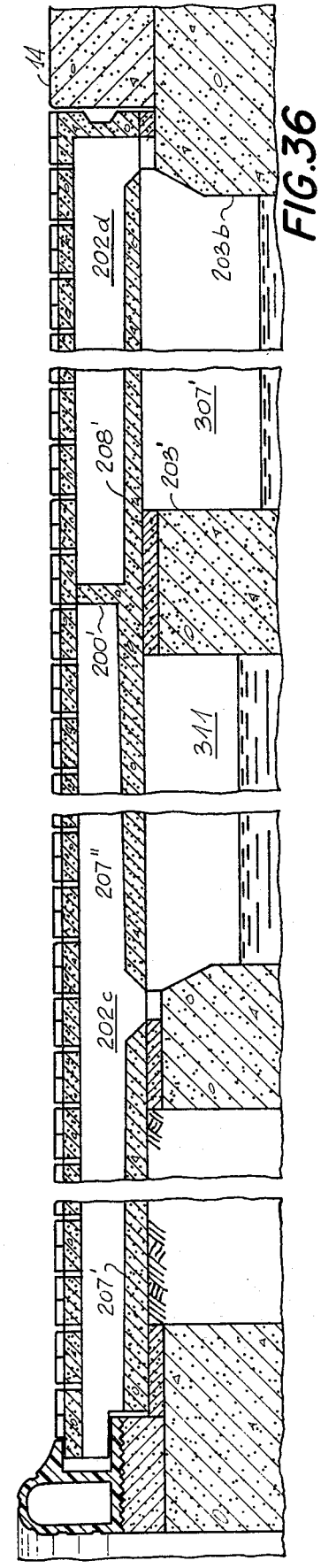

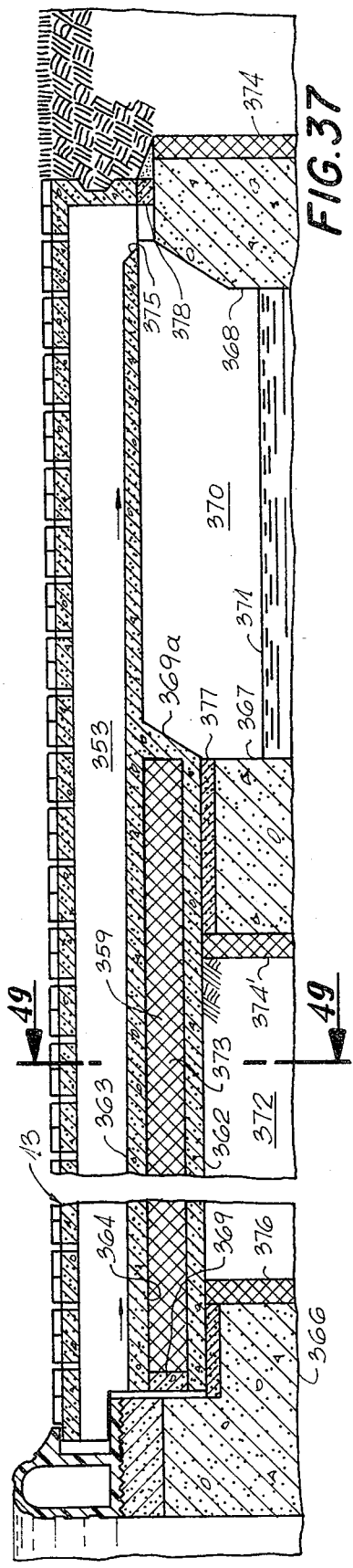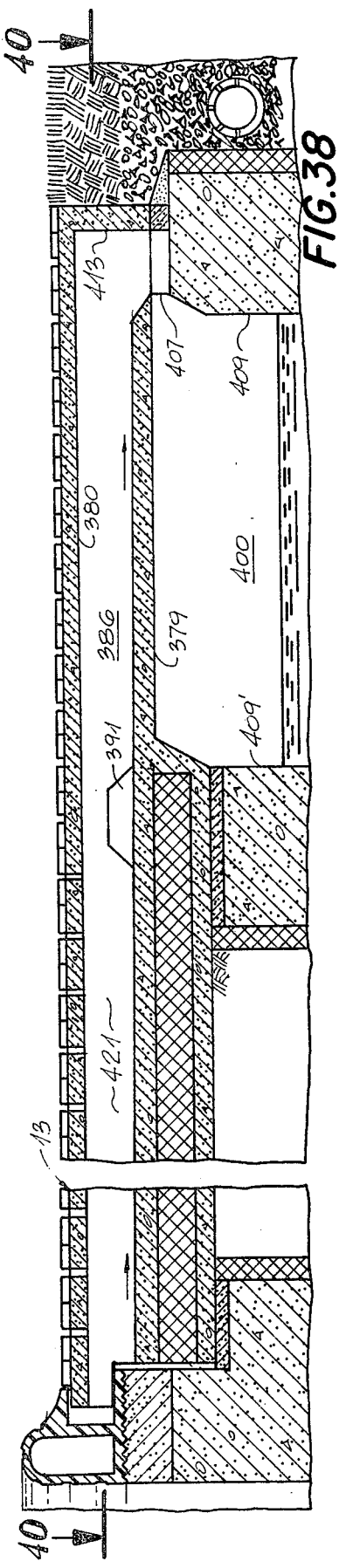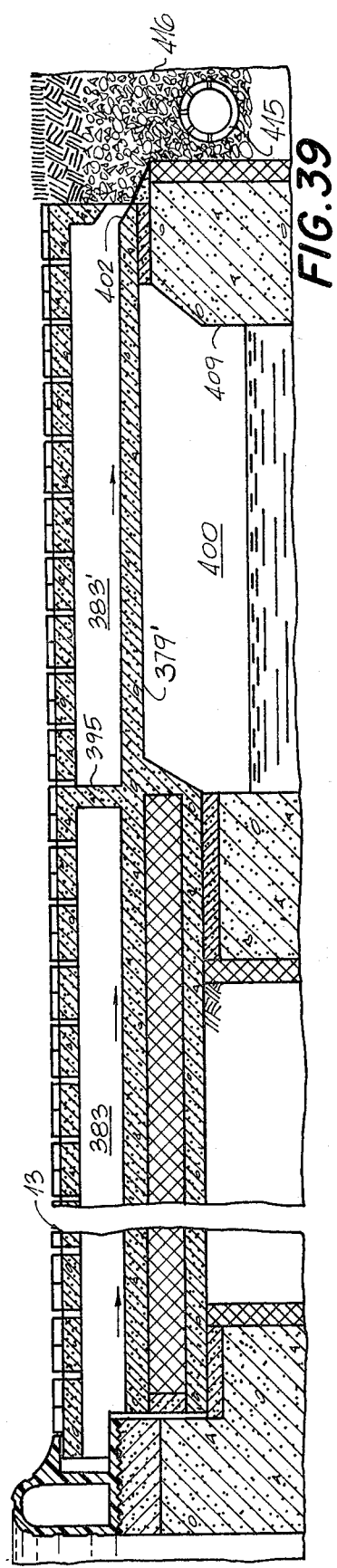

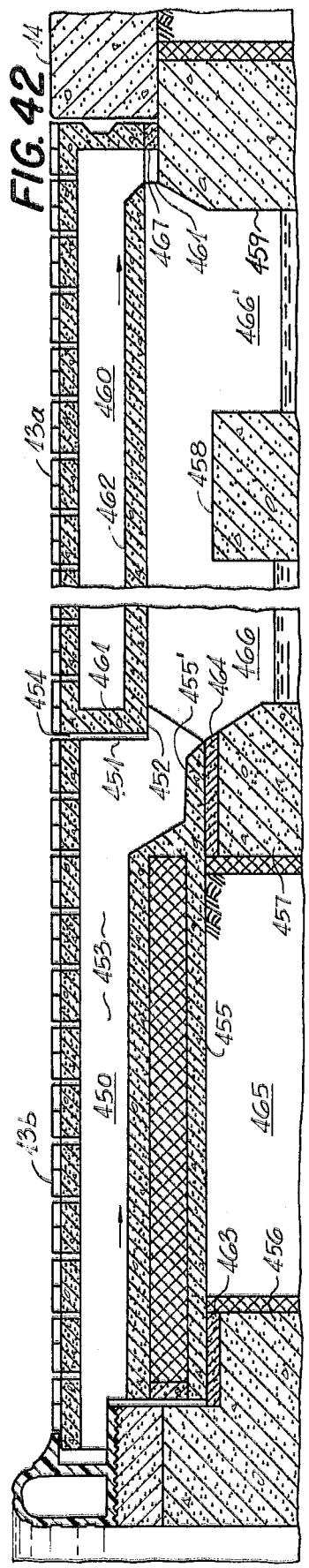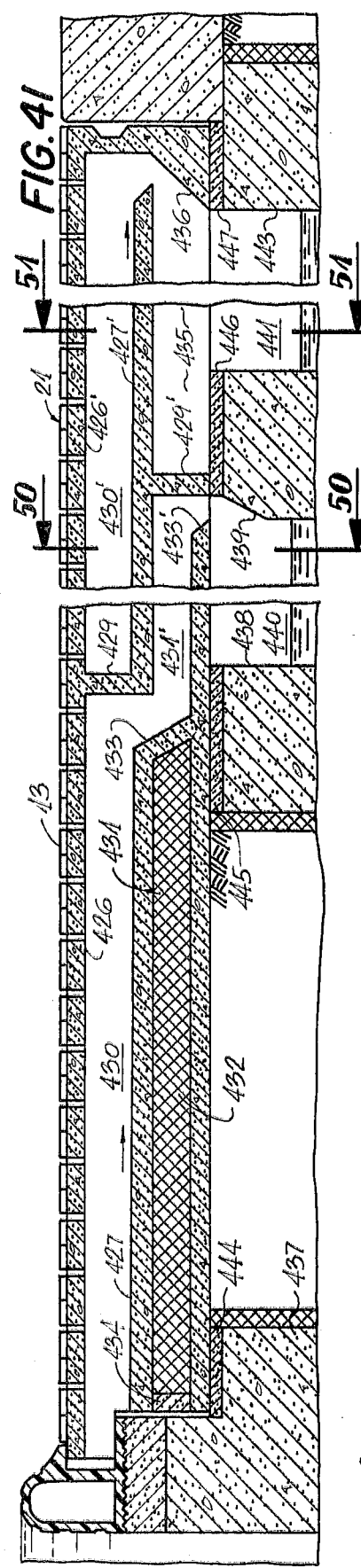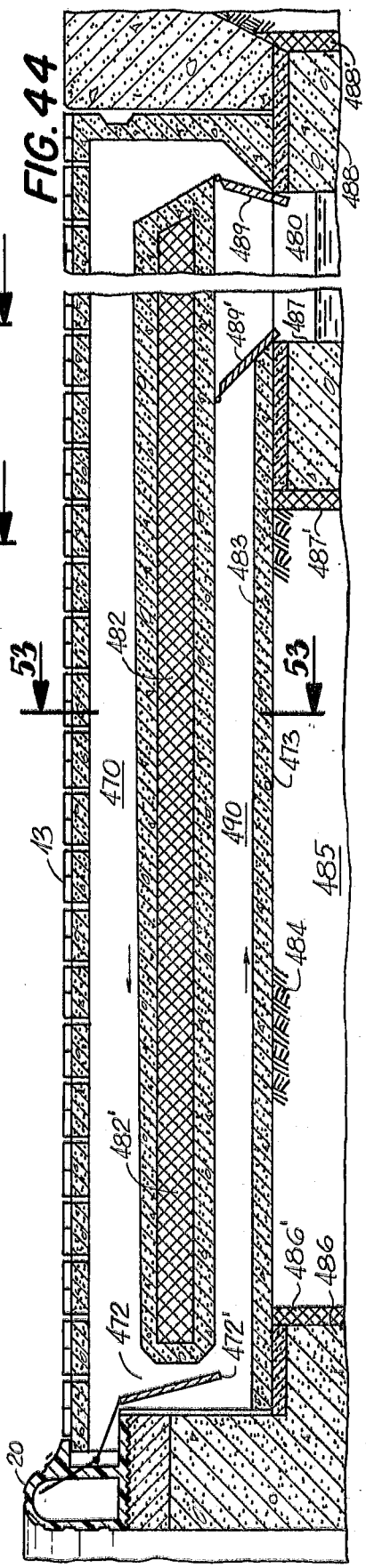

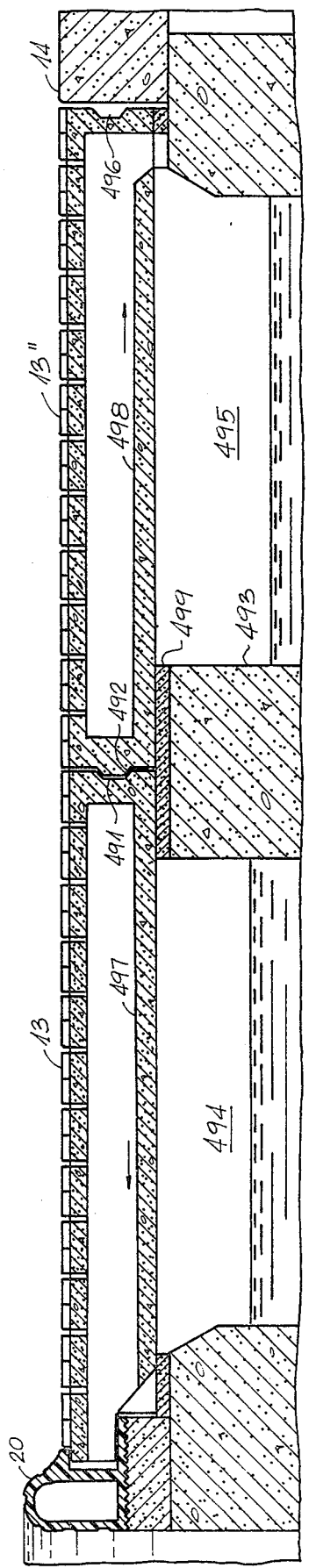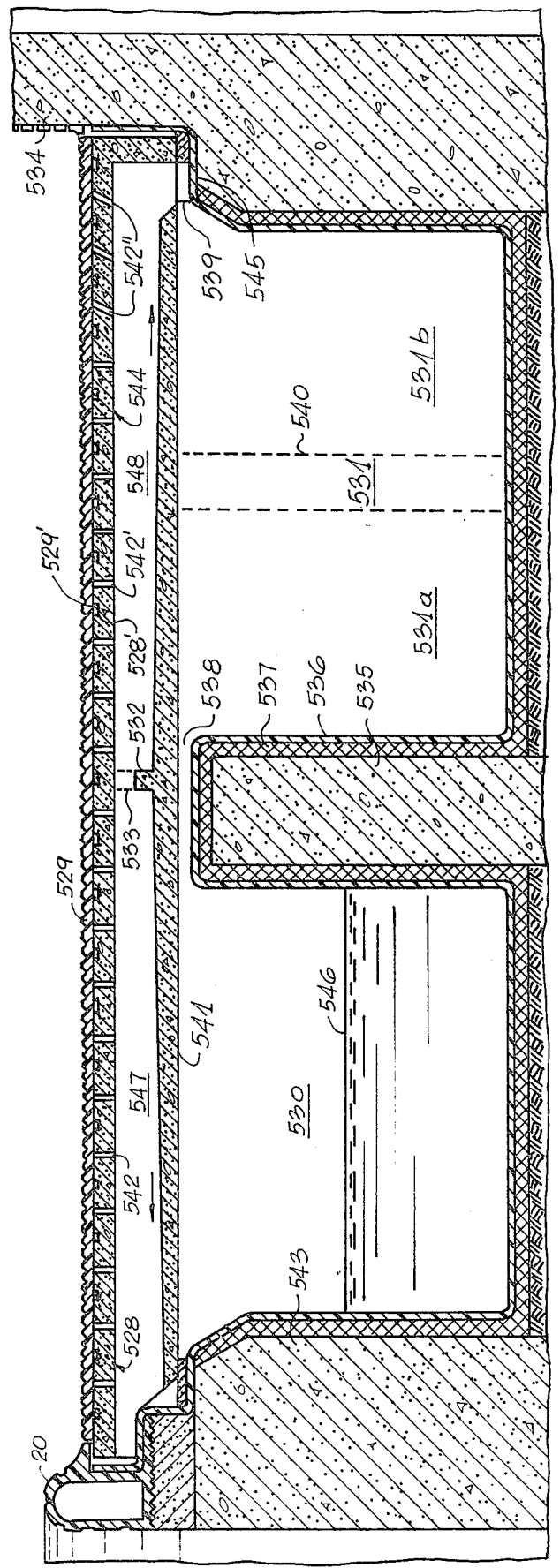

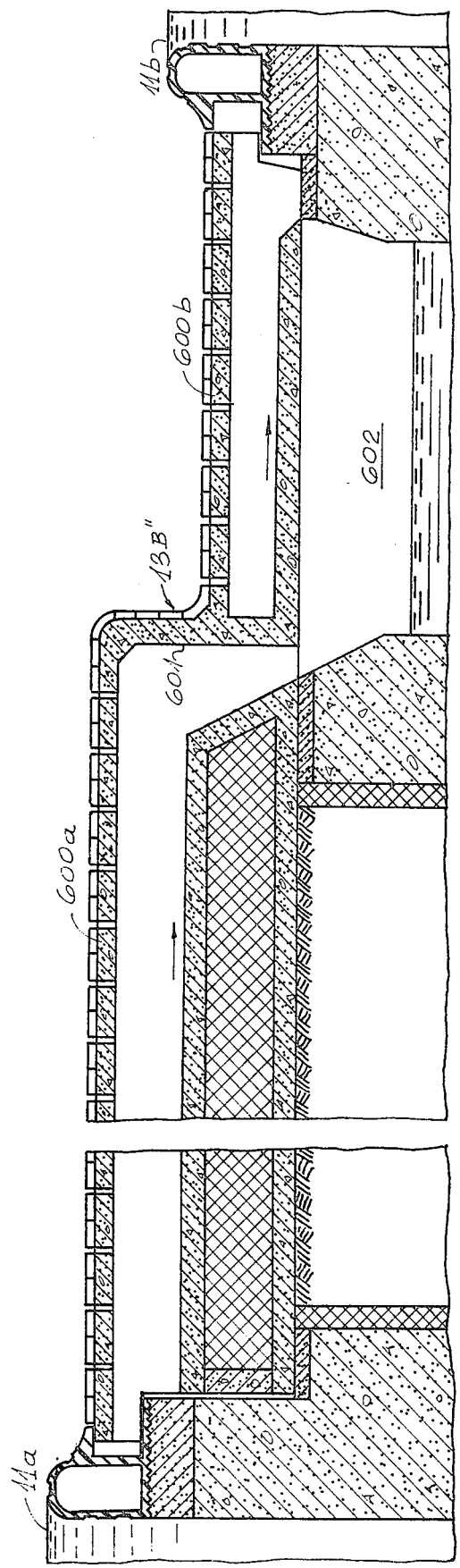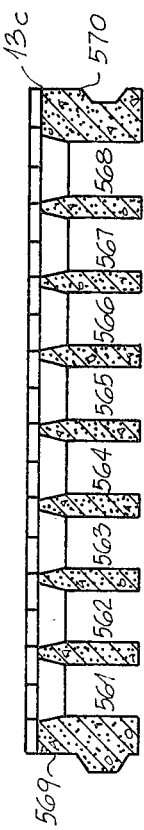

COPING AND DECK SYSTEM FOR A SWIMMING POOL

CROSS-RELATED APPLICATIONS

This application is a continuation in-part of Ser. No. 859,253 filed Dec. 9, 1977, now U.S. Pat. No. 4,249,273.

FIELD OF THE INVENTION

The invention relates to coping and deck systems for a swimming pool and, in particular, to such systems which may employ a surge tank for collection of overflow water from the swimming pool and splashed water from swimmers on the deck. The invention further relates to coping and deck systems employing means associated with solar energy for heating and cooling purposes.

BACKGROUND

Conventional swimming pools require the provision of an overflow system with a reservoir known as a surge tank for recirculation of water from the pool. The recirculated water is filtered and optionally cooled or heated to adjust the conditions in the main body of water in the swimming pool.

Coping systems are known for conveying of water including both the recycled water and water which comes from bathers when they leave the pool.

Hereafter, when I refer to a "coping system" this will be intended to refer to the construction which receives overflow water from the swimming pool for recycle back to the main body of water in the swimming pool, whereas a "deck system" refers to a system specifically intended not only for recirculating overflow water, but also, to capture water from bathers for separate collection and provide a required pool deck. The deck system will generally have a greater width, that is, will extend a greater distance beyond the swimming pool than the coping system.

Numerous systems are known in the art for collection of overflow water for recirculation back to the pool. In conjunction with a surge tank, these systems involve complex construction which require piping connections, substantial excavation of the surge tank or construction of a surge trench in immediate proximity to the perimeteral walls of the pool. A common foundation is generally employed for the coping section and the perimeteral wall of the pool. This requires the use of large monolithic structure of concrete for the perimeteral wall, the surge tank and for covering platforms.

In a conventional swimming pool coping construction (Costello U.S. Pat. No. 3,585,656) there is disclosed a coping extending outwardly from the perimetral wall of the pool which has a deck surface formed with apertures for supply of collected water to a surge trench therebelow. This construction has the disadvantage of requiring a relatively massive construction and the direct discharge of overflow water into the surge trench leads to a great deal of noise. Moreover, the direct presence of the surge trench beneath the apertures can be disquieting to people using the pool.

SUMMARY OF THE INVENTION

An object of the invention is to provide coping and deck systems which are simple in construction and which avoid the need for a surge trench.

Another object of the invention is to provide coping and deck systems in which when a surge trench is employed it need not be in direct proximity to the swimming pool.

Another object of the invention is to provide coping and deck systems in which collected water does not directly enter the surge trench from the surface of the system but is caused to flow through channels which lead to the surge trench.

Another object of the invention is to provide a light weight coping and deck systems which are easily installed without the need for massive structural elements.

Yet, another object of the invention is to provide coping and deck systems which are readily adaptable to existing systems at relatively low cost and with relative simplicity of construction.

Still another object of the invention is to provide coping and deck systems which will permit selection of heating and cooling paths by solar energy of recycled swimming pool water or selection of a path in which the temperature of the water is unaffected.

Another object of the invention is to provide means by which the coping and deck systems can be adapted with different indicia to provide selective marking at the periphery of the pool.

Another object of the invention is to provide coping and deck systems having separate means for respective collection of overflow water and splash water.

In a particular embodiment of the invention, the collection means may comprise trenches.

Another object of the invention is to provide a construction of the deck system which is suitable for operation with a HVAC system, particularlly for an indoor pool, to condition the air in the pool enclosure.

In accordance with the above and further objects of the invention, there is contemplated collection apparatus for water from a swimming pool which has a bounding side wall comprising an overflow member at the side wall of the pool for flow of pool water thereover and flow receiving means extending outwardly from the overflow member for receiving overflow water therefrom. The flow receiving means comprises a hollow member including upper and lower flanges and a longitudinal channel between the flanges. The upper flange has openings therein for passage of water through the upper flange into the channel. A surge tank is disposed at a level below the channel and the flow receiving means further comprises means providing communication between the channel and the surge tank for flow of water from the channel to the surge tank.

The invention will be described in greater detail hereafter in conjunction with the annexed drawings.

BRIEF DESCRIPTION OF THE SEVERAL VIEW OF THE DRAWINGS

FIG. 1A is a perspective view of a portion of a swimming pool employing a deck system in accordance with the present invention.

FIG. 1B is a perspective view of a portion of a swimming pool employing a pool coping in accordance with the present invention.

FIG. 2 is a top plan view of a portion of a swimming pool coping constructed in accordance with the present invention.

FIG. 16 is a sectional top view on line 16—16 in FIG. 15a.

FIG. 18 is a sectional taken on line 18—18 in FIG. 17a.

FIG. 19 is a partial plan view of a swimming pool deck system in accordance with the present invention.

FIG. 20 is a sectional view taken on line 20—20 in FIG. 19.

FIG. 21 is a sectional view taken on line 21—21 in FIG. 19.

FIG. 28 is a partial plan view of another modification of the swimming pool deck system shown in FIG. 19.

FIG. 29 is a sectional view taken on line 29—29 in FIG. 28.

FIG. 30 is a sectional view taken on line 30—30 in FIG. 28.

FIG. 31 is a sectional view taken on line 31—31 in FIG. 19.

FIG. 32 is a sectional view of a swimming pool deck system in accordance with the present invention illustrating a slight modification of the structure in FIG. 31.

FIG. 33 is a sectional view of another modification of the structure in FIG. 31.

FIG. 34 is a sectional view of a swimming pool deck system in accordance with the present invention illustrating a modification of the structure in FIG. 33.

FIG. 35 is a sectional view of another modification of the structure in FIG. 31.

FIG. 36 is a sectional view of another modification of the structure in FIG. 31.

FIG. 37 is a sectional view of another modification of the structure in FIG. 31.

FIG. 38 is a sectional view taken on line 38—38 in FIG. 24.

FIG. 39 is a sectional view taken on line 39—39 in FIG. 24.

FIG. 41 is a sectional view showing a modification of the structure in FIG. 31.

FIG. 42 is a sectional view of a swimming pool deck system in accordance with the present invention illustrating a modification of the structure in FIG. 37.

FIG. 44 is a sectional view of another modification of the structure in FIG. 31.

FIG. 45 is a sectional view of a modification of the structure in FIG. 3.

FIG. 46 is a sectional view of a modified swimming pool deck system with a surge trench construction in accordance with the present invention.

FIG. 52 is a sectional view taken on line 52—52 in FIG. 48.

FIG. 55 is a sectional view of an embodiment of a deck system utilized between two swimming pools at different elevations.

DETAILED DESCRIPTION

Figure 3:
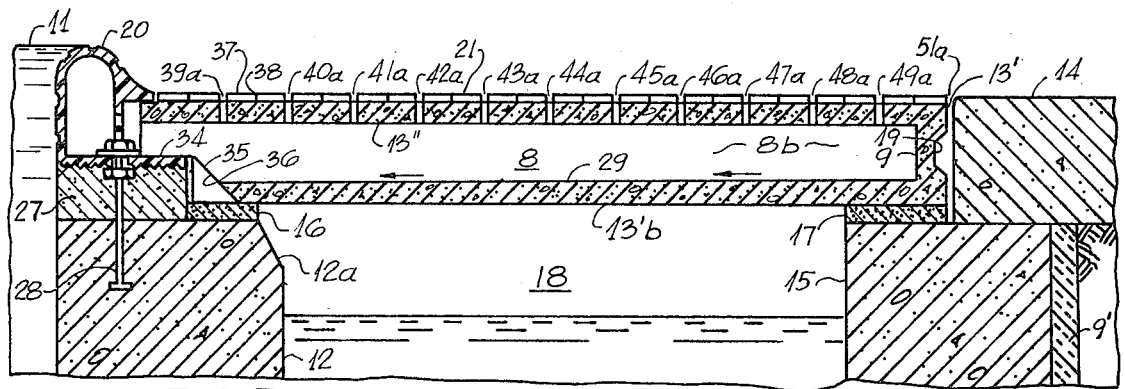
FIG. 3 is a sectional view taken on line 3—3 in FIG. 2.

Refering to FIGS. 1A and 1B, therein is shown a swimming pool 10 having bounding side walls 12 and containing a body of water 11. In FIG. 1A a horizontally disposed swimming pool deck system 13 extends outwardly from the side walls 12 and in FIG. 1B a horizontally disposed swimming pool coping 13' extends outwardly from the side walls 12. An additional deck surface 14 surrounds the deck system 13 and the pool coping 13'.

Figure 7:
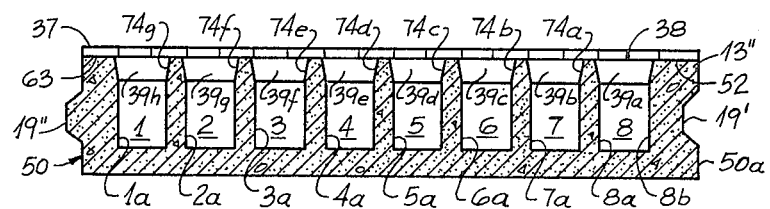
FIG. 7 is a sectional view taken on line 7—7 in FIG. 2.

In FIG. 3 it is seen that the swimming pool coping 13' comprises two parts consisting of overflow member 20 and flow receiving member 21. The overflow member 20 which will be described in detail later is mounted on and fastened to the pool wall 12 with anchor bolts 28 and after final adjustments and levelling of the overflow member, a space under the overflow member 20 if filled with grout 27 or other suitable material. The flow receiving member 21 is a monolithic body made of concrete for low cost application or advanced composites high-performance materials consisting of matrix reinforced with a fiber. The matrix can be a thermosetting resin such as an epoxy, polyester or polyimide; or a thermoplastic resin such a polysulfone. The reinforcement can be graphite (carbon)boron or aramid fibers. Composites made with graphite fibers are lightweight, exceptionally strong, zero coefficients of expansion, high thermal conductivity and other unique mechanical properties not achievable with any other materials. The flow receiving member 21 comprises an upper flange 13" provided with rows of slots 39a–49a, 39b–49b ... 39h–49h for receiving water from the body of water 11 in the swimming pool which overflows over the overflow member 20. The overflow water flows through the slots 39a–49a ... 39h–49h into longitudinal channels 1–8 (FIG. 7). The channels are closed at their far ends by vertical web 9 provided with a groove 19 on the exterior surface for a purpose which will be explained later. A lower flange 13'b of the flow receiving member 21 is connected to the upper flange 13" by vertical webs 1a–8a and 8b (FIG. 7). The upper surface 29 of flange 13'b which forms an interior lower bounding surface for the channels 1–8 is inclined downwardly towards the pool so that overflow water in the channels will flow towards the overflow member 20 and then into a surge trench 18, as indicated by the arrows, via open space 35 formed between a diagonally cut surface 36 of the lower flange and the top of the pool wall 12 and a sloped portion 12a of wall 12 to provide a non-drip type of flow. The surge trench 18 is insulated on its rear exterior surface with insulation 9'.

The flow receiving member 21 is installed by interlocking one end thereof in overflow member 20 on ledge 34 and applying grout 16 under edges 36 and the top of the pool wall 12 (with spaces for flow of water from space 35), and grout 17 between trench wall 15 at the lower surface of flange 13'b. The upper surface of flange 13" is covered by ceramic tiles 37 having a non-slip finish by applying grout 38 between the tiles and the flange. Extending outwardly and level with the upper surface of the coping 13' is the deck surface 14.

Figure 4:
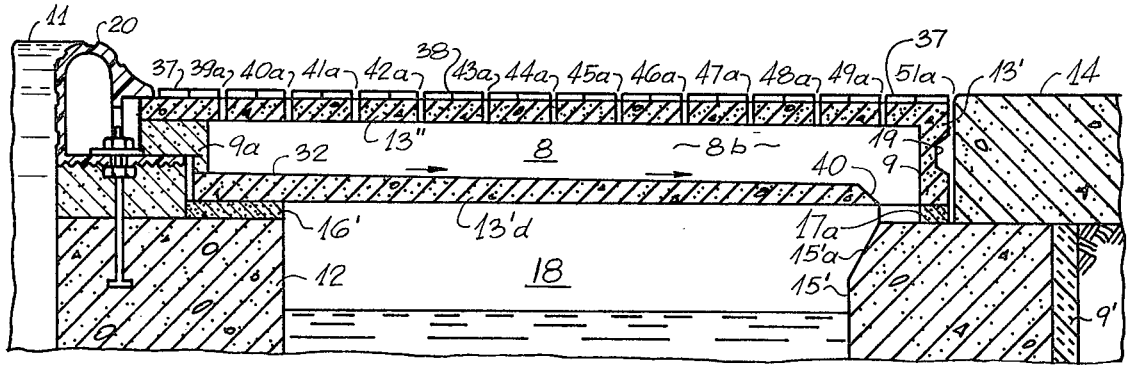
FIG. 4 is a sectional view of a modification of the structure in FIG. 3.

FIG. 4 shows a modified arrangement of the construction in FIG. 3 where the surface 32 of lower flange 13'd is sloped in opposite direction, viz rearwardly and downwardly towards surge trench wall 15' for conveying overflow water to trench 18 via opening 40 in lower flange 13'd spaces in grout 17a and surface 15'a of surge trench wall 15'.

Figure 6:
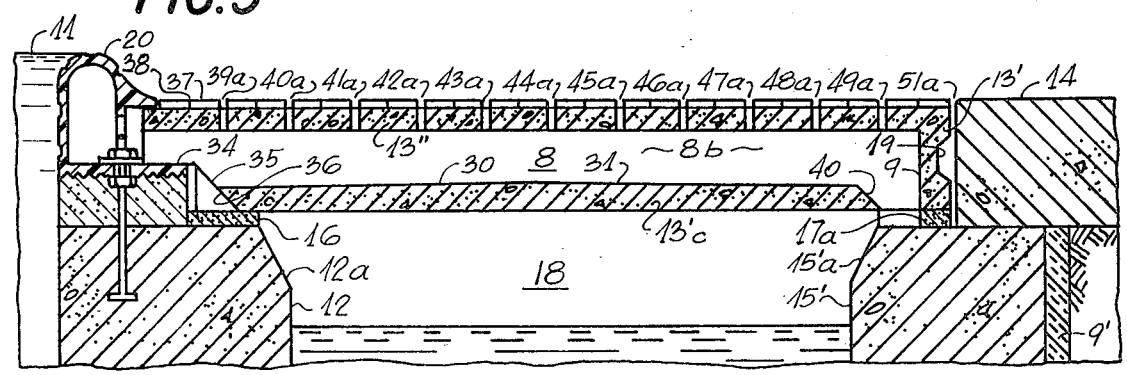
FIG. 6 is a sectional view of another modification of the structure in FIG. 3.

FIG. 6 shows a modified arrangement of the construction in FIG. 3 in which the upper surface of the lower flange of flow receiving member 13'c is inclined in opposite directions from an approximate middle point along surface 30 towards the swimming pool wall 12 and surface 31 towards the surge trench wall 15'. Overflow swimming pool water is discharged from channels 1–8 into trench 18 at opposite ends. This duel flow arrangement will result in noise elimination and is recommended especially for indoor swimming pool installations.

FIG. 2 shows the coping 13' to include an outer covering assembled from segments 50 each of generally the same size arranged in side by side, horizontal, adjacent relation at the swimming pool perimeter. The coping segments 50 are best seen in FIGS. 2 and 7 where upper flange 13" defined between overflow element 20 and pool deck 14 is covered with ceramic tiles 37 with grout 38 there between except for the narrow spaces defined parallel to each other at the openings 39a, 40a, 41a, 42a, 43a, 44a, 45a, 46a, 47a, 48a and 49a providing communication with channel 8 at the openings 39b, 40b, 41b, 42b, 43b, 44b, 45b, 46b, 47b, 48b, 49b providing communication with channel 7, at the openings 39c, 40c, 41c, 42c, 43c, 44c, 45c, 46c, 47c, 48c, 49c providing communication with channel 6, at the openings 39d, 40d, 41d, 42d, 43d, 44d, 45d, 46d, 47d, 48d, 49d providing communication with channel 5, at the openings 39e, 40e, 41e, 42e, 43e, 44e, 45e, 46e, 47e, 48e, 49e providing communication with channel 4, at the openings 39f, 40f, 41f, 42f, 43f, 44f, 45f, 46f, 47f, 48f, 49f providing communication with channel 3, at the openings 39g, 40g, 41g, 42g, 43g, 44g, 45g, 46g, 47g, 48g, 48g providing communication with channel 2, and at the openings 39h, 40h, 41h, 42h, 43h, 44h, 45h, 46h, 47h, 48h, 49h providing communication with channel 1. The openings 39a–49a ... 39h–49h are tapered downwardly so that the upper portions of the webs 1a–8a, 8b are tapered as shown in FIG. 7 at 74a–74g. Further tapered upper portions of webs 1a, 2a, 3a, 4a, 5a, 6a, 7a, 8a and 8b are shown in FIG. 2 at 74g, 75g, 76g, 77g, 78g, 79g, 80g, 81g, 82g, 83g, 84g for web 2a; 74f, 75f, 76f, 77f, 78f, 79f, 80f, 81f, 82f, 83f, 84f for web 3a; 74e, 75e, 76e, 77e, 78e, 79e, 80e, 81e, 82e, 83e, 84e for web 4a; 74d, 75d, 76d, 77d, 78d, 79d, 80d, 81d, 82d, 83d, 84d for web 5a; 74c, 75c, 76c, 77c, 78c, 79c, 80c, 81c, 83c, 84c for web 6a; 74b, 75b, 76b, 77b, 78b, 79b, 80b, 81b, 82b, 83b, 84b for web 7a; 74a, 75a, 77a, 78a, 79a, 80a, 81a, 82a, 83a 84a for web 8a; 52–62 for web 8b; and 63–73 for end web 1a. The channels 1–8 are shown as rectangular but they may also be cylindrical. The spaces between segments 50 may be provided with grout 51 for permanent installation thereof and for joining the segments together or the segments may be provided with caulking material 51a for removability of the segments or at points where different materials are joined, for example, at an expansion joint with deck 14 made of conceret.

Figure 5:
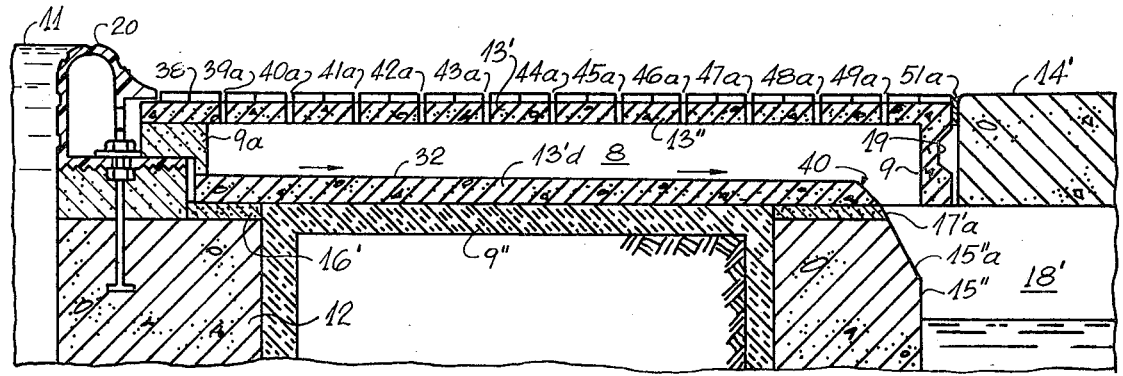
FIG. 5 is a sectional view of another modification of the structure in FIG. 3.

With reference to FIG. 5, swimming pool coping 13' is identical to the coping in FIG. 4 except for the location of surge trench 18'. The renovation of existing swimming pools in most cases does not permit the accomodation of the surge trench within the perimeter or the swimming pool wall without considerable expense, structural changes, difficult excavations, etc., for example, for gunite pools. The surge trench 18' as shown in FIG. 5 is located, remote from the swimming pool wall 12 and is not limited in width whereby the width may vary in respect of field conditions, capacity requirements and the like. Overflow water from the swimming pool 11 travels in the longitudinal channels 1–8 as explained in relation to FIGS. 3 and 4 and then flows by gravity to surge trench 18' over slope surface 40 of the lower flange 13'd, the sloped surface of setting grout 17'a and slope surface 15"a of surge trench wall 15". The surge trench 18' is covered with a concrete deck 14' extending to the rear wall (not shown) of the trench 18' and alternatively the trench may be covered with an extension of the flow receiving member as shown on FIG. 4S. As shown, the coping 13' is permanently set on setting grout 16' on swimming pool wall 12 and setting grout 17'a of trench wall 15".

However, if the longitudinal channels 1-8 are enclosed at their inner ends by a vertical member 9a as shown in FIG. 5, the setting grout 16' on the swimming pool wall and 17'a on the surge trench wall may be eliminated and coping 13' may rest on top of walls 12 and 15" without any structural bonding requirement, eliminating skilled labor, and the coping will be held in interlocking fashion by tongue 19" and groove 19' between segments as evident from FIG. 7. The space between the pool 12 and the surge wall 17'a may serve as a pipe tunnel or backfill as shown. For energy conservation purposes, rigid insulation 9" is applied to pool wall 12, the lower flange 13'd of the coping and surge trench wall 15".

Figure 8:
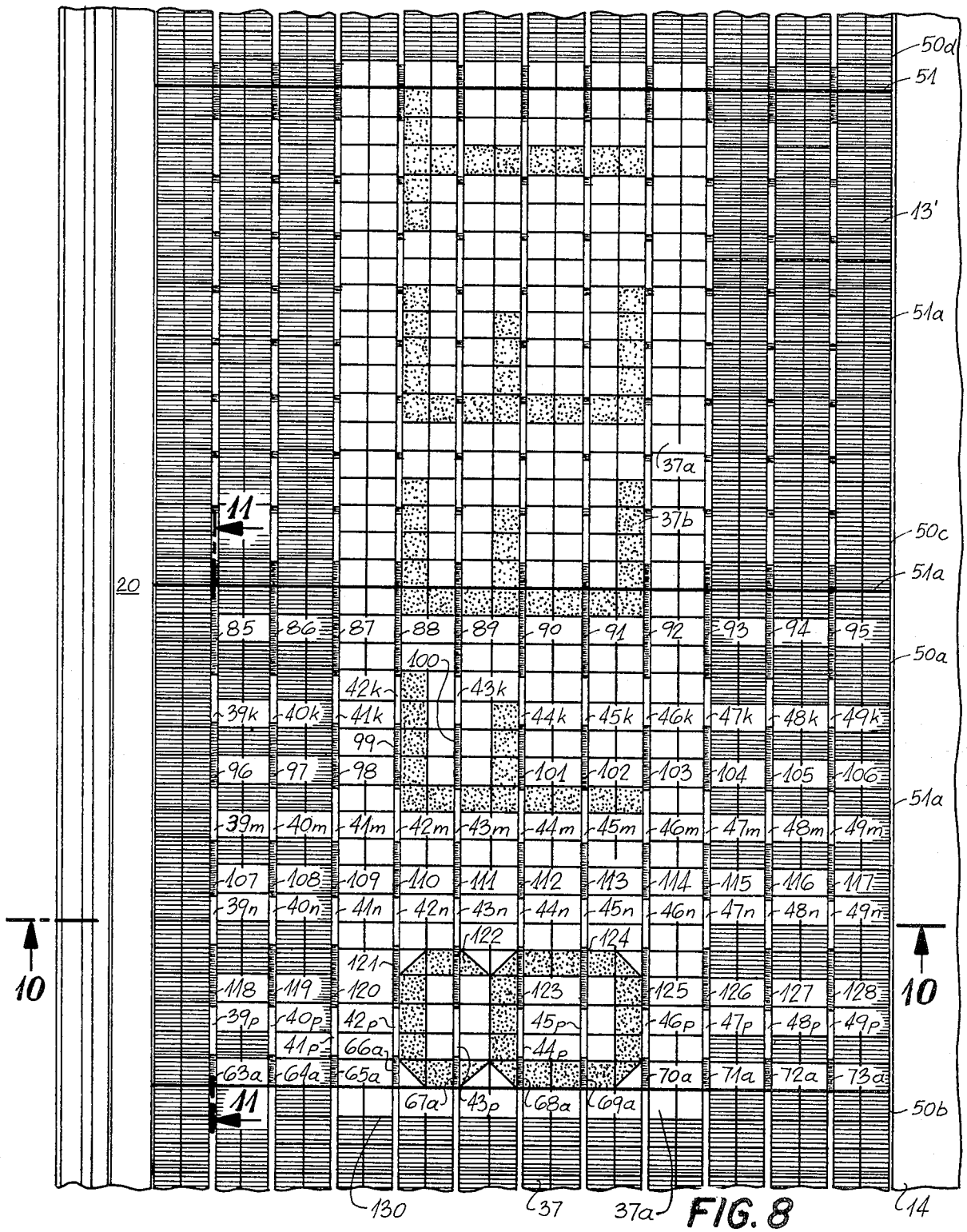
FIG. 8 is a top plan view of a portion of a swimming pool coping with a depth marker in one operative position.

Referring to FIG. 8, the coping 13' is shown with segments 50a and 50c and partially shown 50b and 50d in side by side relation between overflow member 20 and pool deck 14. Further, a depth marker 130 is incorporated in the ceramic tiles 37 of the coping 13'. The tiles 37 are generally of bluish or dark colors, and the depth marker comprises tiles 37a with background of white color and tiles 37b with lettering and numbering to form the indicia "8 FEET", the lettering and numbering on tiles 37b being of dark blue or black. In conventional swimming pools all segments of the coping are set permanently and are the same in all respects as in FIGS. 2 and 3. In a swimming pool construction having a movable pool bottom for changing the depth, segment 50a of the coping is removable and may be installed upside-down. Segments 50b, 50c and 50d are set permanently with grout 51 and removable segment 50a is set with caulking material 51a. Segments 50b, 50c and 50d are the same in all respects except for segment 50c where the tongue 19" configuration is eliminated.

Figure 9:
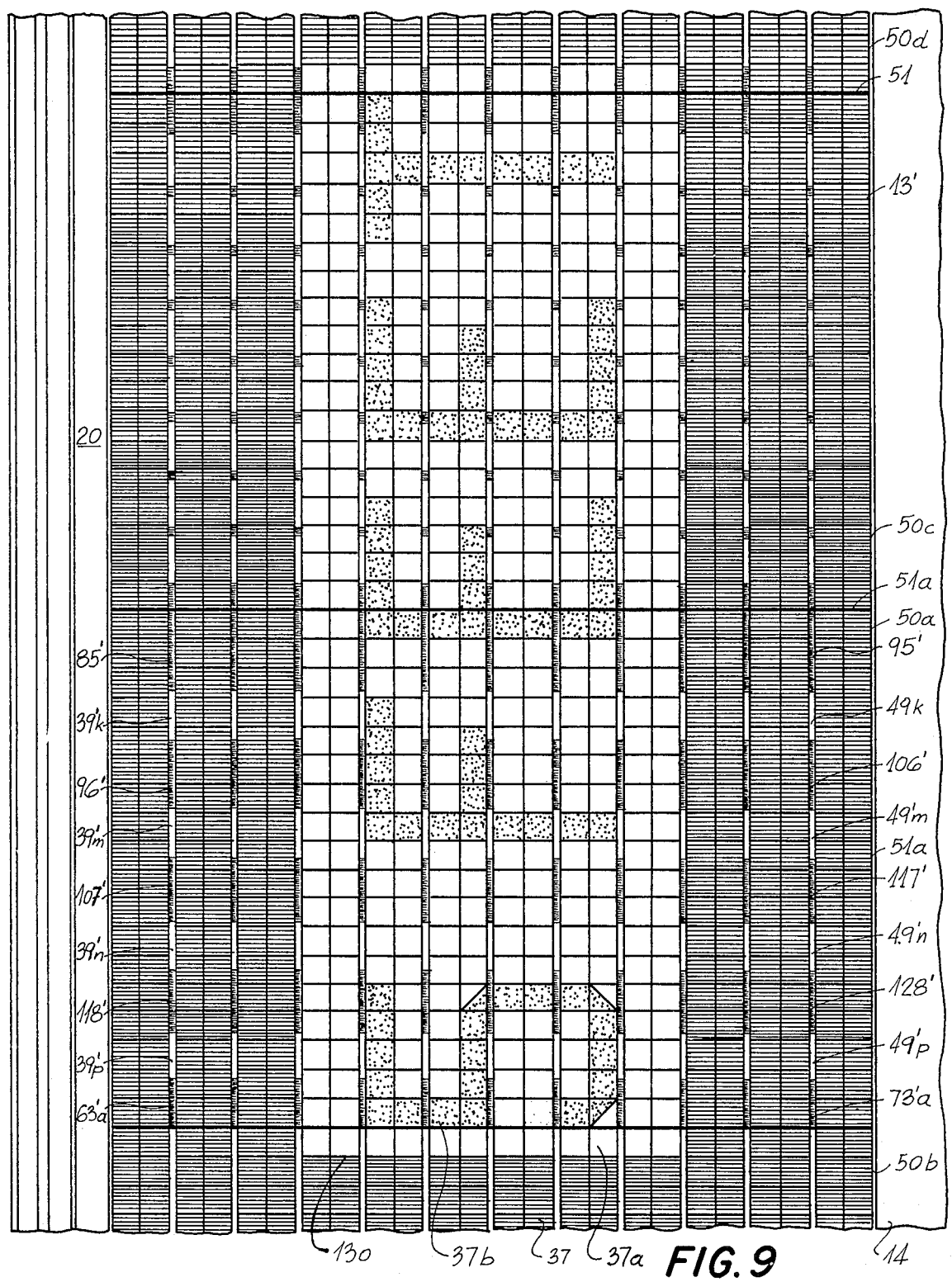
FIG. 9 is a plan view of the portion of the swimming pool coping in FIG. 8 with the depth marker in inverted position.
Figure 10:
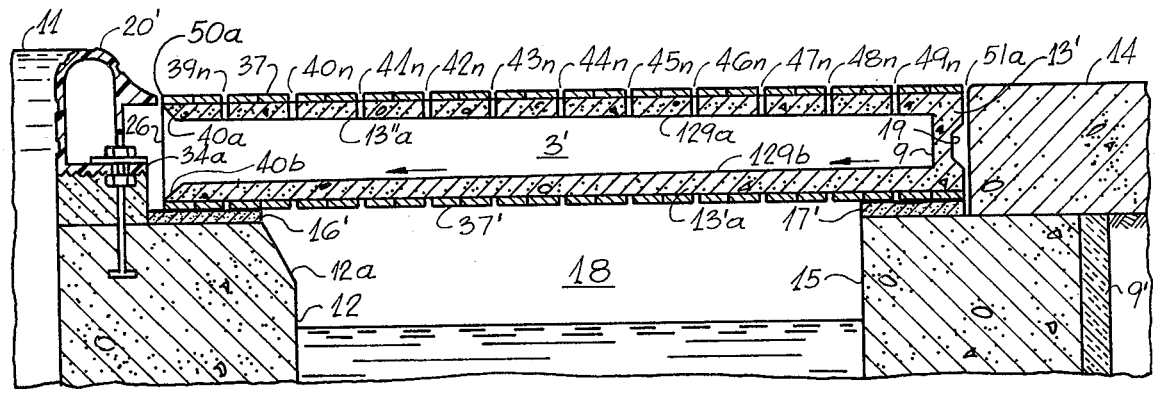
FIG. 10 is a sectional view taken on line 10—10 in FIG. 8.
Figure 11:
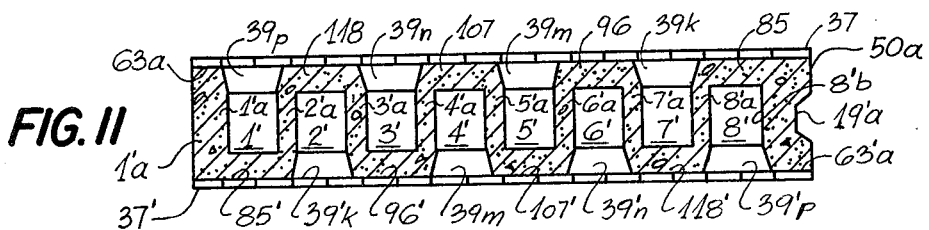
FIG. 11 is a sectional view taken on line 11—11 in FIG. 8.

In transverse section, the segment 50a has a Greek-key cross-section as shown in FIG. 11 wherein adjacent webs are alternately connected at their tops and bottoms so that the channels 1'-8' are alternately open at top and bottom. Segment 50a comprises openings 39k-49k providing communication with channel 7' as best seen in FIG. 11, openings 39m-49m providing communication with channel 5', openings 39n-49n providing communication with channel 3' and openings 39p-49p providing communication with channel 1', while spaces 85-128 are out of communication with channels 2', 4', 6' and 8' respectively. The upper portion of web 1'a is shown at 63a in FIG. 11 and the lower portion of web 8'b is shown at 63'a. Coping segment 50a is shown in one position in FIG. 8 and in inverted position in FIG. 9. In the inverted position in FIG. 9 of the coping segment, the depth marker 130 is changed from "8 FEET" in FIG. 8 to "5 FEET" in FIG. 9. The segments 50b, 50c and 50d are the same in FIGS. 8 and 9. In segment 50a in FIG. 9 openings 39'k-49'k provide communication with channel 2' as best seen in FIGS. 10 and 11, openings 39'm-49'm provide communication with channel 4', openings 39'n-49'n provide communication with channel 6', and openings 39'p-49'p provide communication with channel 8'. Spaces 85'-128' are out of communication with channels 1', 3', 5' and 7' respectively, similar to the description with regard to FIG. 8 and 63'a-73'a represent portions of web 8'b. Reversible segment 50a of coping 13' is provided with surface coverings 37 and 37' on opposite flanges 13"a and 13'a serving as reversible portions of the depth marker and both flanges 13"a and 13'a are provided with inclined surfaces 129a and 129b sloped towards overflow element 20' which is modified at 34a.

Openings 39n-49n in flange 13"a provide communication with channel 3' and overflow water from pool 11 which enters channel 3' via openings 39n-49n flows further via slope 40b (or 40a in reversed configuration of segment 50a) and an open space in setting grout 16' and slope 12a of wall 12 into surge trench 18. Segment 50a is further modified as shown at 26 and rests on setting grout 16' of the swimming pool wall 12 and on grout 17' of the surge trench wall 15. It must be also understood that setting grout 16' and 17' serve for elevational purposes only and are not bonded to segment 50a.

Furthermore, setting grout 16' is provided at the joints with other segments, for example, only under vertical web 1'a and 63'a as in FIG. 11. Also segment 50a may be caulked as at 51a with pool deck 14 and with other joining segments in FIG. 9. The reversible coping section may be also used to change a designation expressed in feet to meters.

Figure 12:
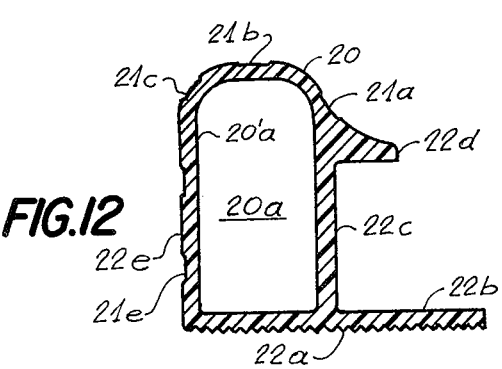
FIG. 12 is a sectional view taken on line 12—12 in FIG. 2.
Figure 14:
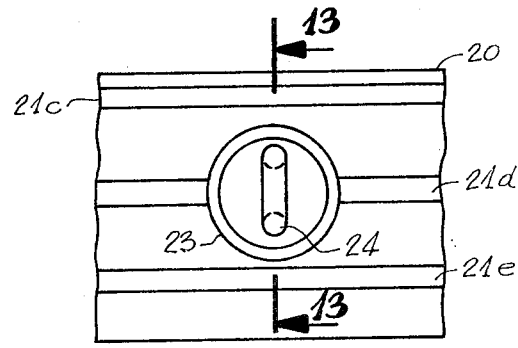
FIG. 14 is a partial internal elevational view of the structure in FIG. 13.

In FIG. 12, overflow member 20 comprises a circular upper flange 22a, a bottom flange 22b and vertical members 22c and 22e. Member 20 may be extruded, molded or cast and may be made of fiberglass or graphite-reinforced polyester resin, epoxy resin, concrete or metal. Bottom flange 22b has a grooved bottom surface 22a for bonding to setting grout on the pool wall as has been explained before. Vertical member 22e and upper flange 22d in contact with the swimming pool water contact channels 21a, 21b, 21c, 21d, 21e as seen in FIG. 14, extending parallel to the pool water edge for damping waves. The interior space 20a in the overflow member 20 in FIG. 12 may be used as disclosed in my earlier applications Ser. Nos. 839,039 and 859,253.

Furthermore, the member 20 surrounding space 20a can be constructed of transparent material and a liquid crystal coating or an electroluminescent coating can be employed on the interior surface 20'a to produce an illuminating effect on the pool edge for safety.

Figure 13:
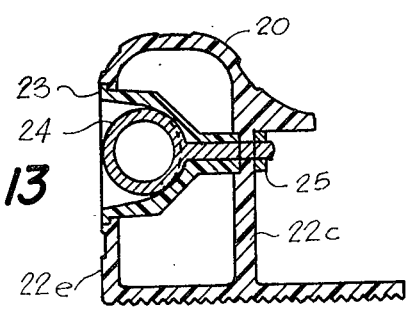
FIG. 13 is a sectional view taken on line 13—13 in FIG. 14.

An anchor can be built-in to overflow member 20 for a life line or racing line as shown in FIGS. 13 and 14 wherein a molded anchor housing 23 with eye bolt 24 is inserted in an opening in vertical members 22e and 22c and locked by nut 25 on the threaded stem of an eyebolt 24. Such construction permits simple installation in the factory or in the field.

Figure 15:
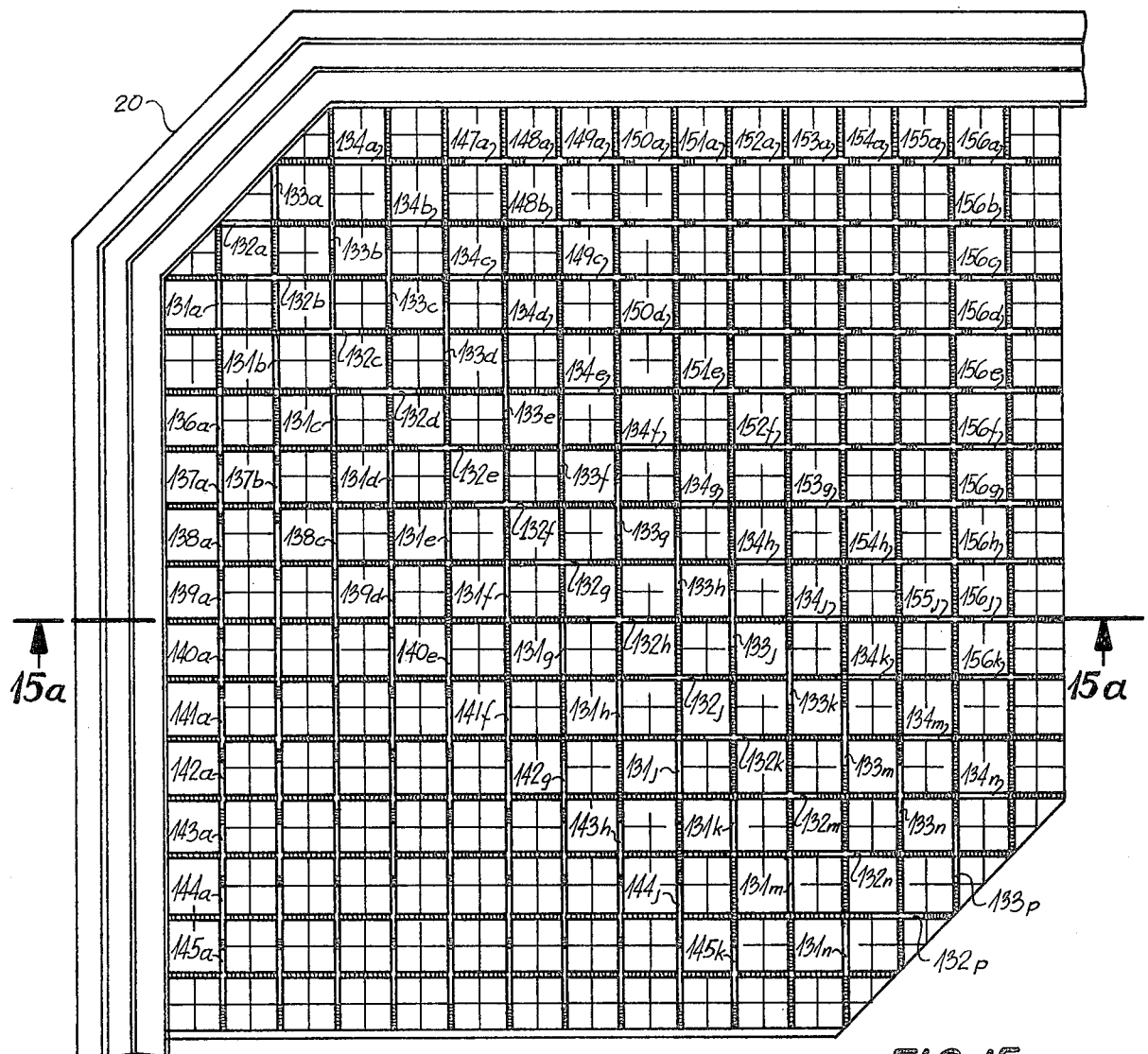
FIG. 15 is a top view of an interior corner segment of a swimming pool coping in accordance with the present invention.
Figure 15A:
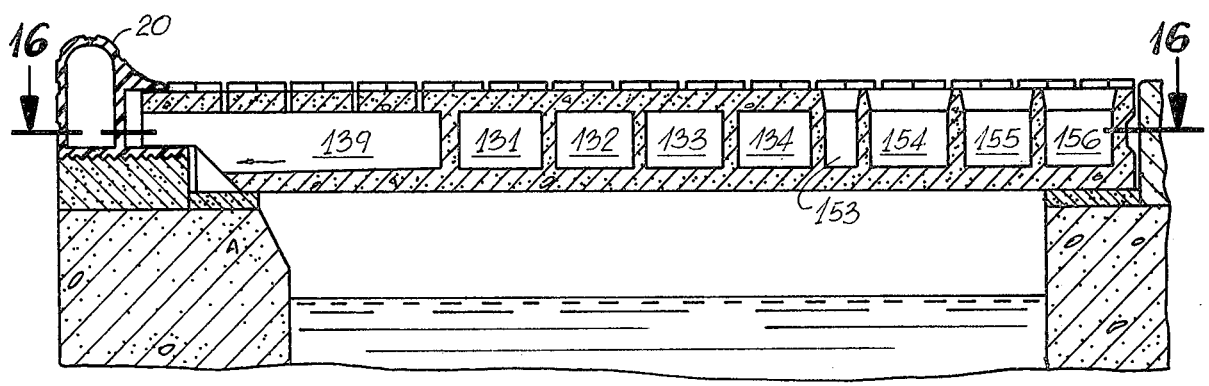
FIG. 15a is a sectional view taken on line 15a—15a in FIG. 15.
Figure 16:
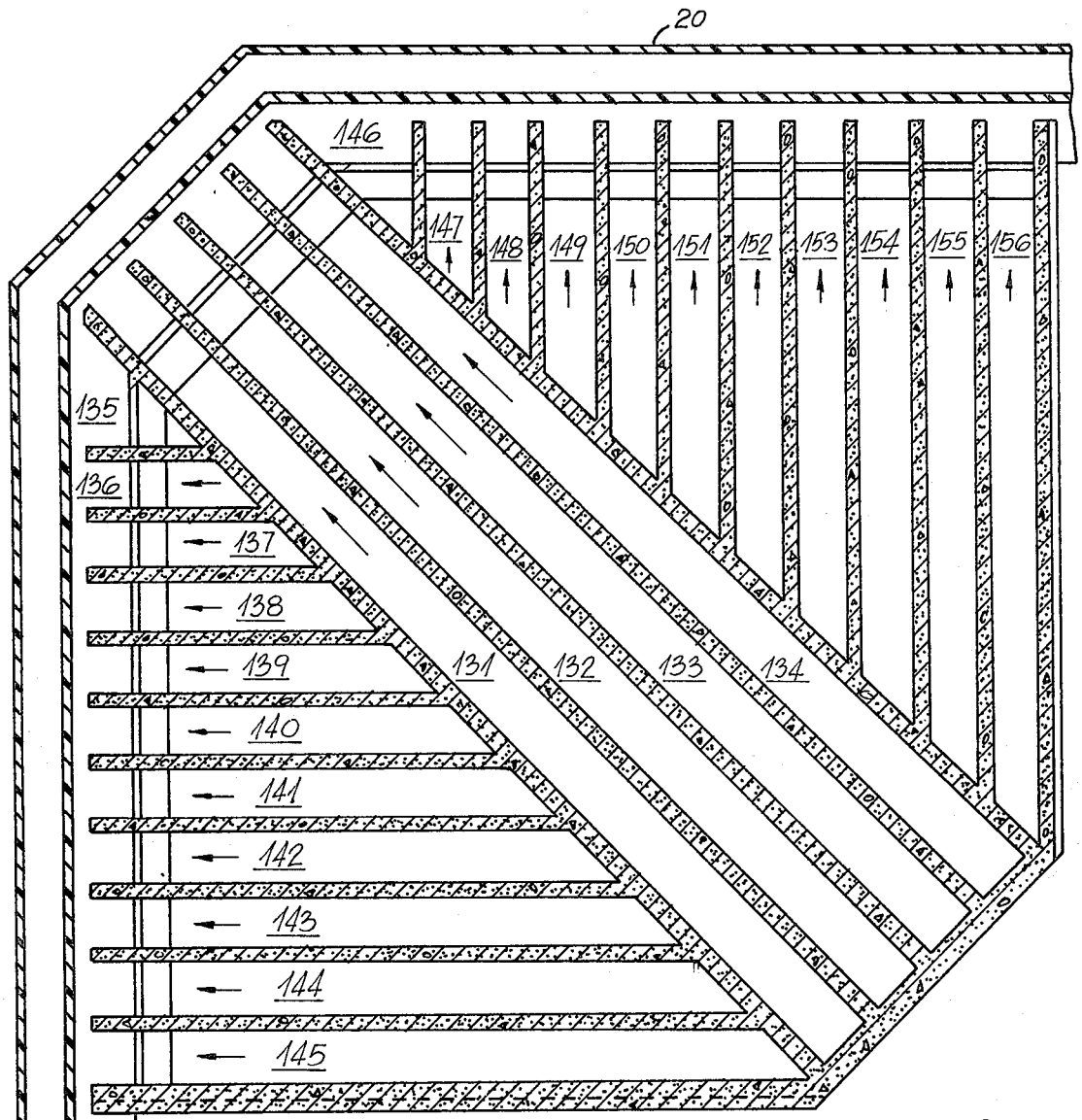

Corner swimming pool copings are shown in FIGS. 15-18 comprising an exterior coping for rectangular swimming pools and an interior coping for L-shape swimming pools. An interior coping as in FIGS. 15, 15a and 16 comprises overflow element 20 surrounding the flow receiving member on three sides. The inside of the flow receiving member at the interior corner is shown in FIGS. 16 and 15a and consists of main channels 131, 132, 133 and 134 and angulated channels 135-145 and 146-156 which form an angle with the main channels and extend at right angles to one another. The flow of overflow swimming pool water from the channels to the surge trench below is indicated by the arrows. As is shown in FIG. 15 slotted openings in the surface between ceramic tiles and indicated by 131a-131n provide communication with channel 131, openings 132a-132p provide communication with channel 132, openings 133a-133p provide communication with channel 133. Openings 134a-134n provide communication with channel 134. Openings 136a provides communication with channel 136. Openings 137a, 137b provide communication with channel 137. Openings 138a-138c provide communication with channel 138. Openings 139a-139d provide communication with channel 139. Openings 140a-140e provide communication with channel 140. Openings 141a-141f provide communication with channel 141. Openings 142a-142g provide communication with channel 142. Openings 143a-143h provide communication with channel 143. Openings 144a-144j provide communication with channel 144. Openings 145a-145k provide communication with channel 145. Opening 147a provides communication with channel 147. Openings 148a, 148b provide communication with channel 148. Openings 149a-149c provide communication with channel 149. Openings 150a-150d provide communication with channel 150. Openings 151a-151e provide communication with channel 151. Openings 152a-152f provide communication with channel 152. Openings 153a-153g provide communication with channel 153. Openings 154a-154h provide communication with channel 154. Openings 155a-155j provide communication with channel 155. Openings 156a-156k provide communication with channel 156. Channels 135 and 146 are not in communication with the above surface.

Figure 17:
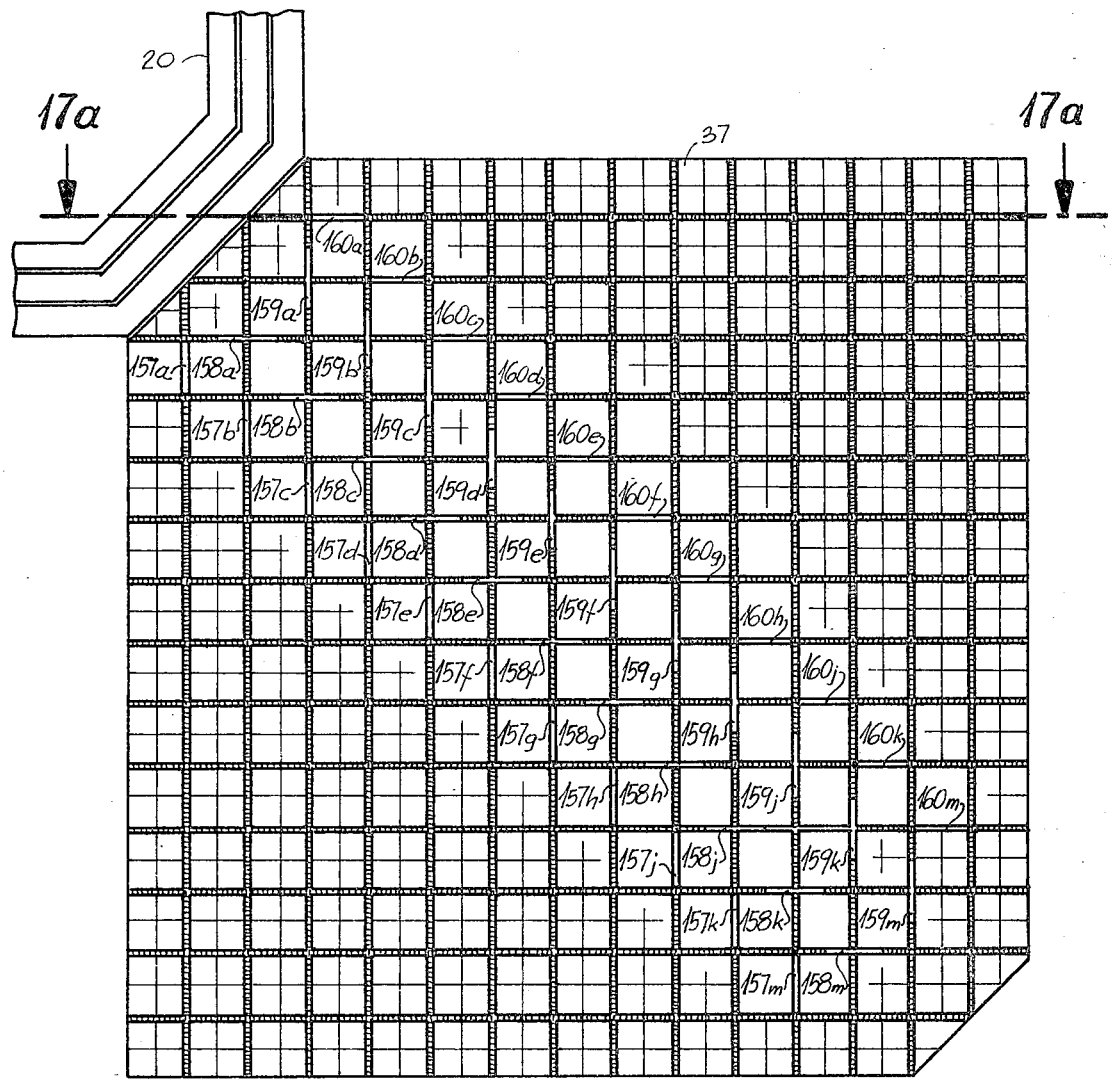
FIG. 17 is a top view of an exterior corner segment of a swimming pool coping in accordance with the present invention.
Figure 18:
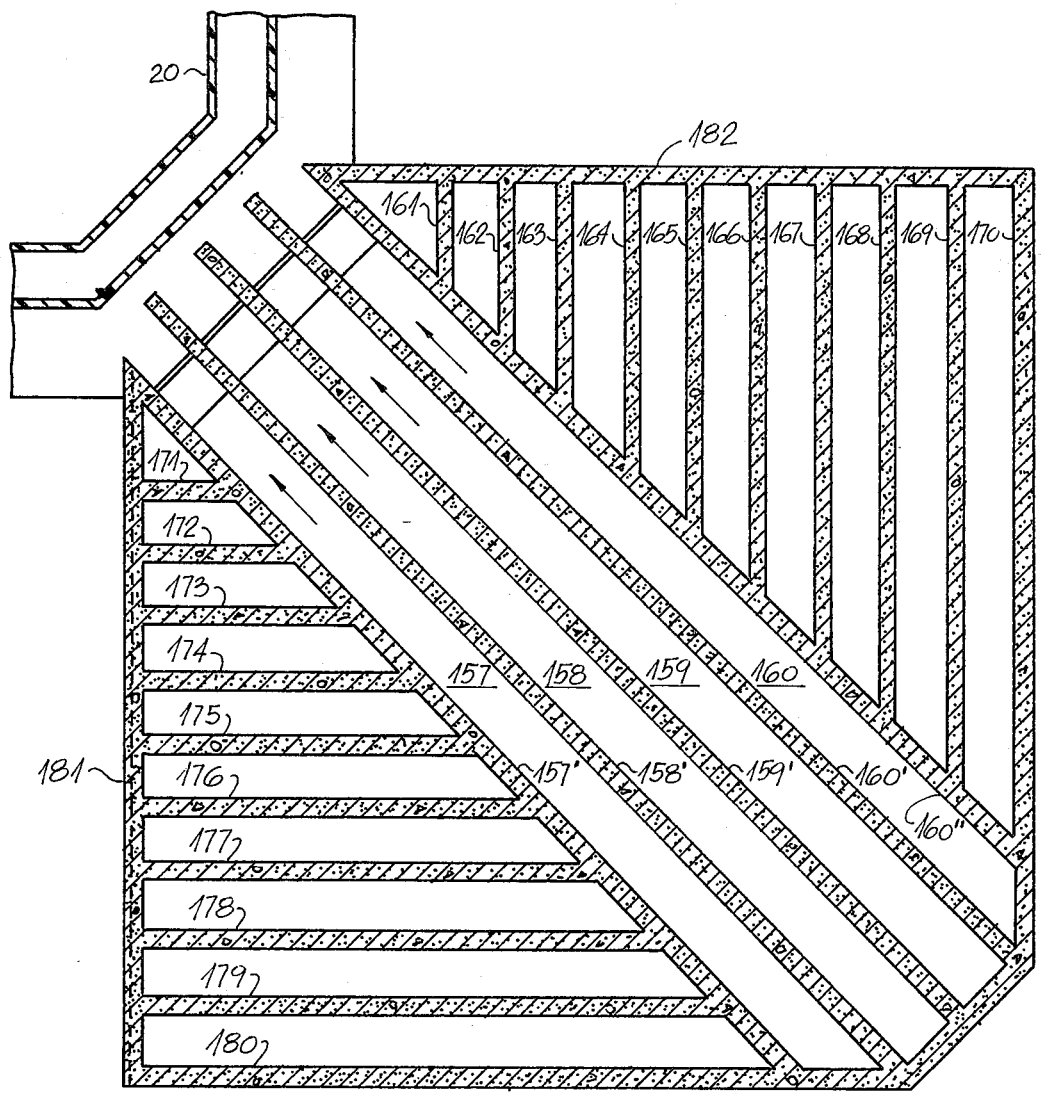
Figure 17A:
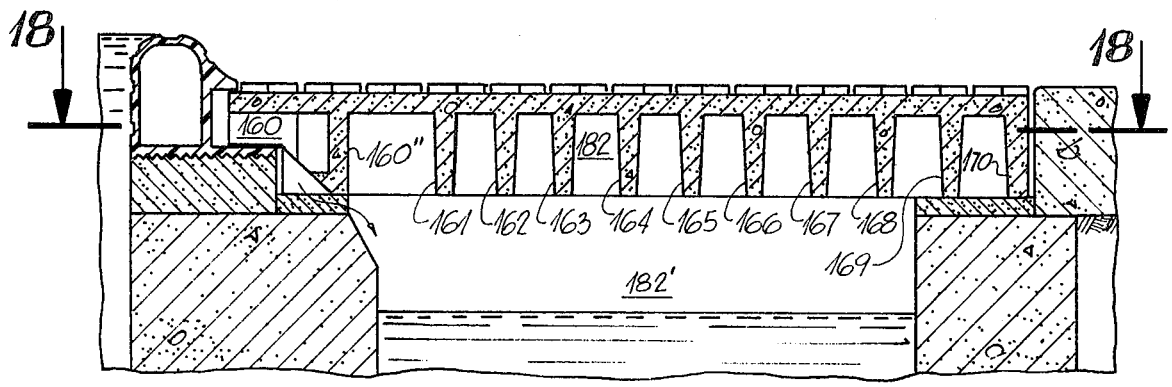
FIG. 17a is a sectional view taken on line 17a—17a in FIG. 17.

The exterior coping shown in FIG. 17 comprises overflow member 20 on one side and a veneer of ceramic tiles 37 on the entire surface with sloted openings opposite the overflow member. Slots 160a-160m provide communication with channel 160 as it is best seen in FIG. 18, openings 159a-159m provide communication with channel 159, openings 158a-158m with channel 158 and openings 157a-157m with channel 157. A sloped bottom surface of channels 157-160 indicated by arrows provide further flow communication of overflow swimming pool water to the surge trench below as shown in FIG. 17a. Furthermore, channels 157-160 in FIG. 18 are separated by vertical members 158'-160' and closure member 170. Additional members 161-170 connect member 160" of channel 160 and closure member 182 on one side and members 171-180 connect closure 181 and member 157' of channel 157. Members 161-180 are open to the interior of surge trench 182 and are provided for structural reinforcement purposes and for weight reduction of the corner element as illustrated in FIG. 17a.

FIGS. 19-30 show the elements of the deck system 13 to be similar in construction in all aspects to coping 13" described in FIG. 2 except that the elongated element of the flow receiving member is of a length to satisfy "the minimum pool deck requirements" established by the Board of Health or other suitable agency. Segment 50' in FIGS. 19 and 31 whose upper flange 200 as shown in FIG. 31 provides communication of recirculating swimming pool water by openings 210-221 with channel 201 (FIG. 20), openings 222-233 with channel 202, openings 234-245 with channel 203, openings, 246-257 with channel 204, openings 258-269 with channel 205, openings 270-281 with channel 207, openings 282-293 with channel 206 and openings 294-305 with channel 208. Water splashed by bathers beyond openings 210-305 in the upper flange of the flow receiving member will communicate by openings 210'-220' with channel 201' (FIG. 21), openings 222'-232' with channel 202', openings 234'-244' with channel 203', openings 246'-256' with channel 204', openings 258'-268' with channel 205', openings 270'-280' with channel 207', openings 282'-292' with channel 206' and openings 294'-304' with channel 208'.

As best shown in FIG. 31 recirculating overflow swimming pool water and splash deck water entering channels 202 and 202' respectively are separated by vertical web 200'.

The slopes of the upper surfaces of bottom flange 205 and 206 will direct water flows along slopes 201 and 201' as a non-drip type flow to surge trenches 306 and 307 separated by wall 203. Accumulated water in surge trench 306 is discharged by gravity or pumped to filtration equipment and returned to the pool.

Water accumulated in the trench 307 is not considered sanitary and is usually discharged to waste. As is clearly evident, the area for receiving splash or deck water is the same as for overflow of swimming pool water and this may be changed by relocation of web 200'.

Figure 22:
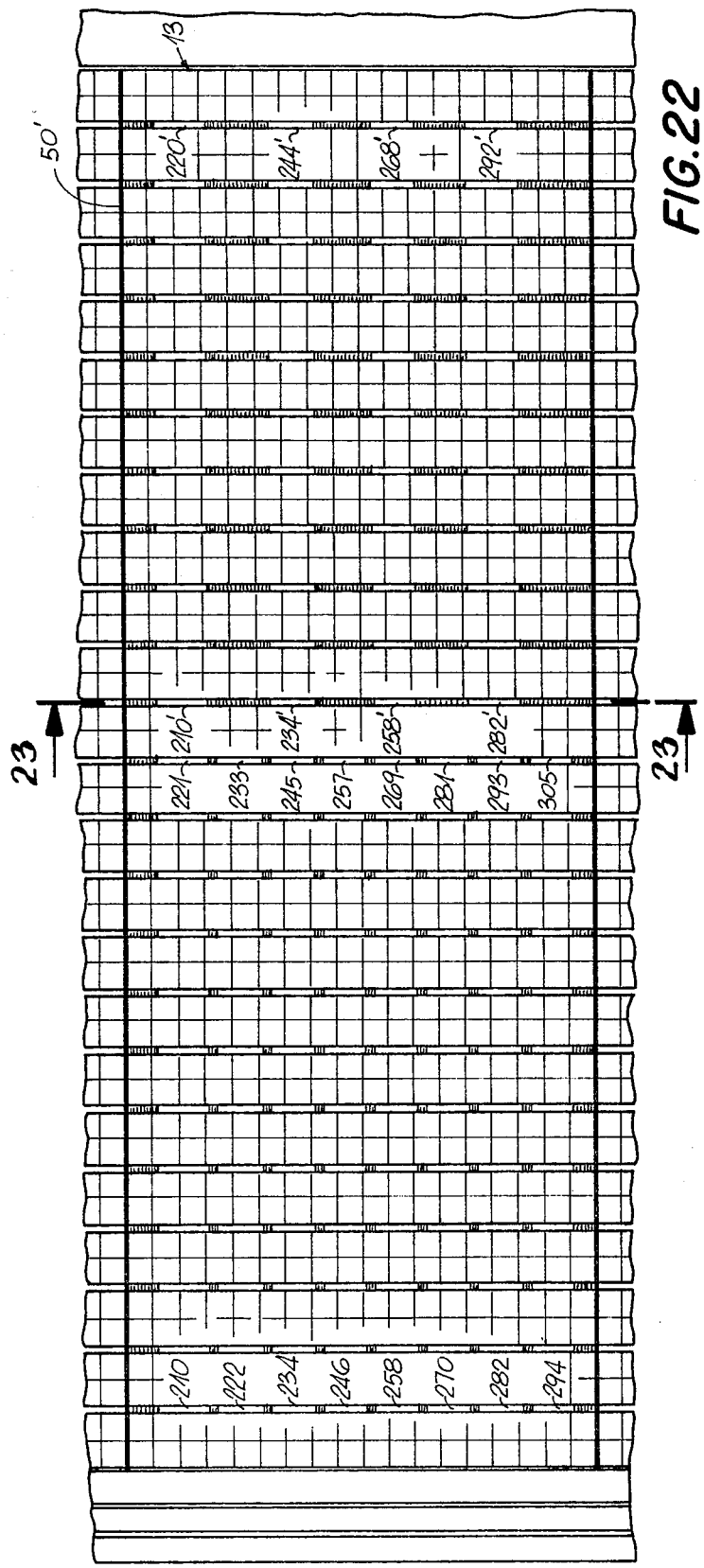
FIG. 22 is a partial view of a modification of the swimming pool deck system shown in FIG. 19.
Figure 23:
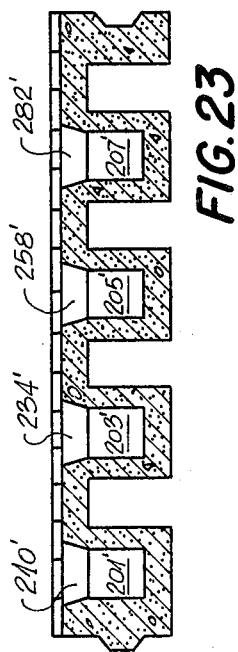
FIG. 23 is a sectional view of a modification taken on line 23—23 in FIG. 22.
Figure 24:
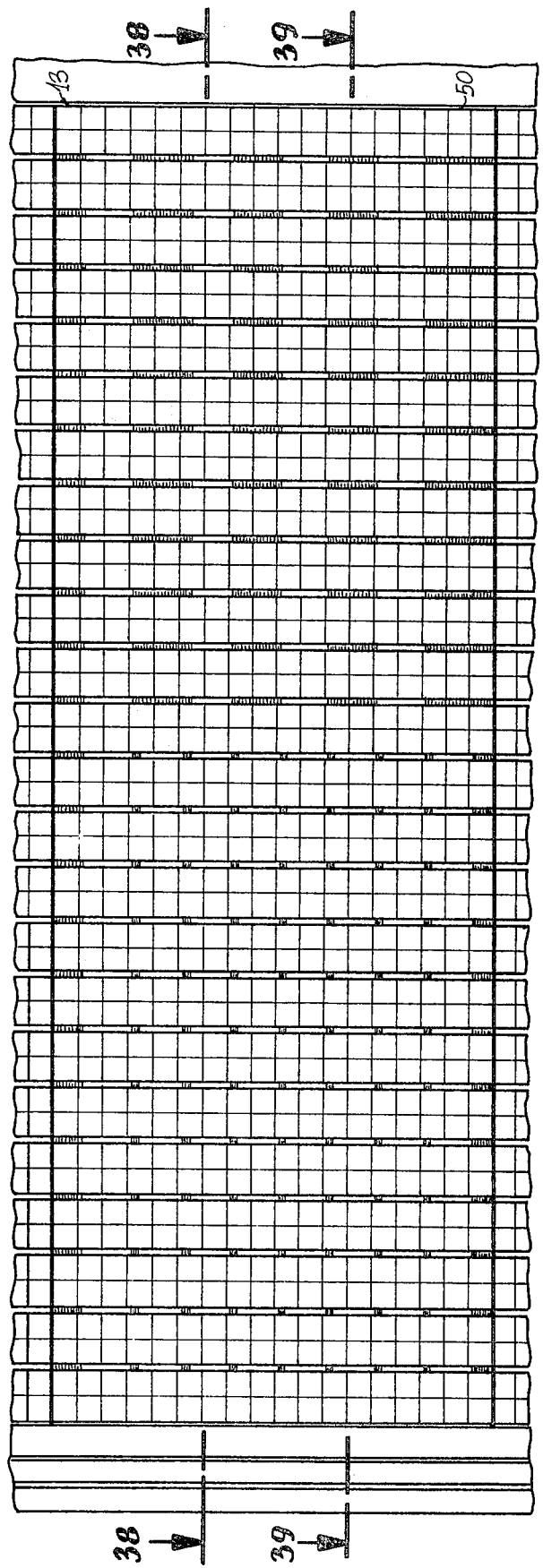
FIG. 24 is a partial plan view of a slight modification of the swimming pool deck system shown in FIG. 22.

A modified arrangement of the construction in FIG. 19 is shown in FIG. 22 where the openings 210-305 for receiving overflow water are identical to those in FIG. 19 and the openings for receiving splash water are decreased by 50%. Openings 210'-220' communicating with channel 201' (FIG. 23), openings 234'-244' communicating with channel 203', openings 253'-268' communicating with channel 205' and openings 282'-292' communicating with channel 207'.

Figure 25:
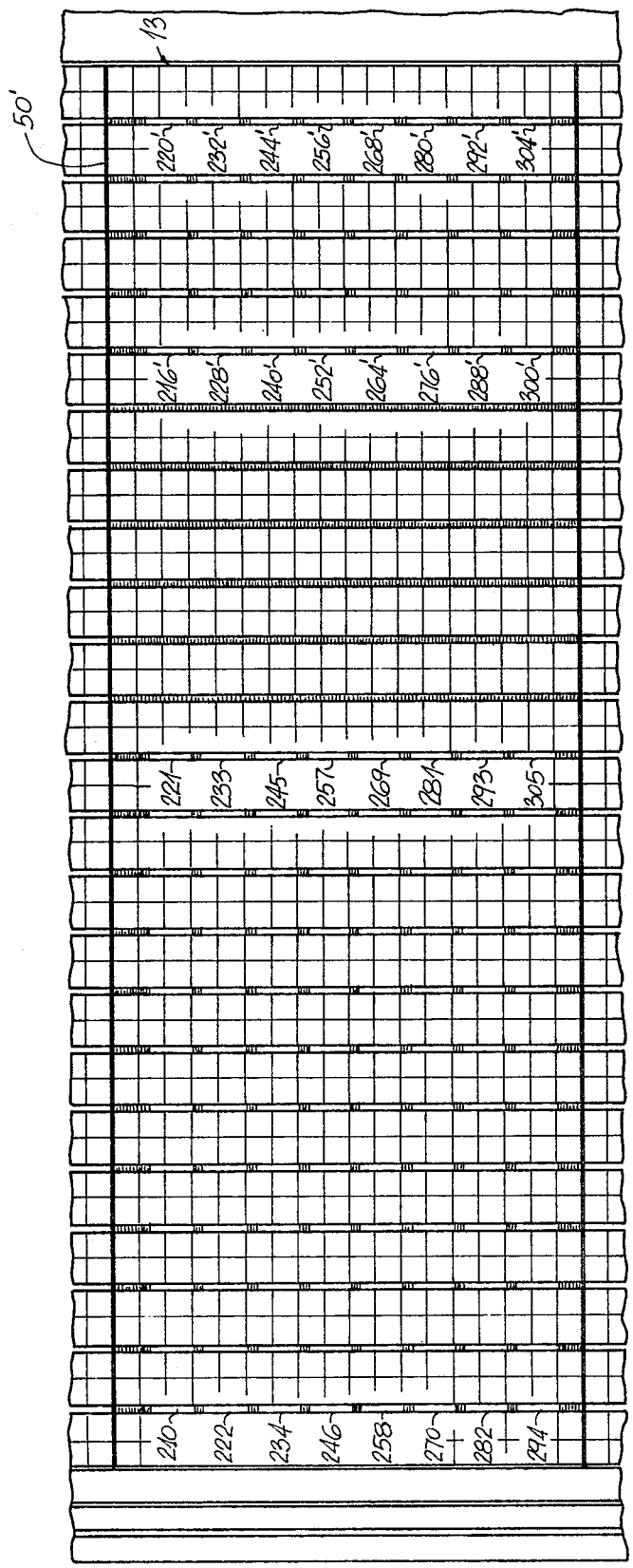
FIG. 25 is a partial plan view of another modification of the swimming pool deck system shown in FIG. 19.
Figure 26:
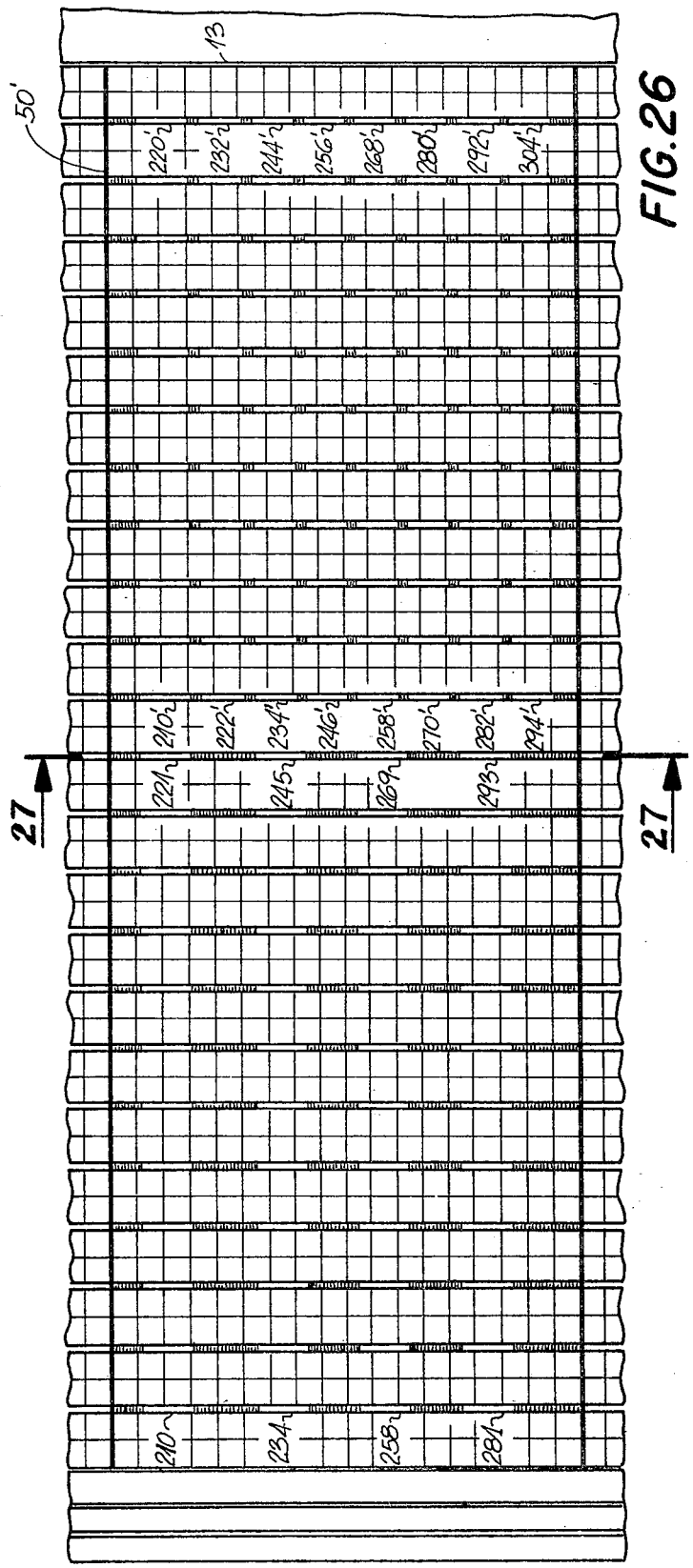
FIG. 26 is a partial plan view of a slight modification of the swimming pool deck system shown in FIG. 19.
Figure 27:
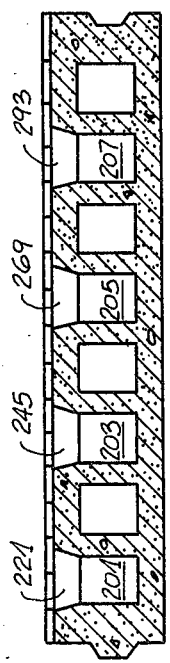
FIG. 27 is a sectional view taken on line 27—27 in FIG. 26.

FIG. 25 shows another modified arrangement of the construction in FIG. 19 where openings 210-305 for receiving overflow water are identical to those of FIG. 19 and the openings for receiving splash water are rearranged in such way to provide physical separation between the water openings. The splash water openings 216'-220' communicate with channel 201' (FIG. 21), openings 228'-232' communicate with channel 202', openings 240'-244' communicate with channel 203', openings 252'-256' communicate with channel 204, openings 264'-268' communicate with channel 205', openings 276'-280' communicate with channel 206', openings 288'-292' communicate with channel 207' and openings 300'-304' communicate with channel 208'. Another modified arrangement of the construction in FIG. 19 is shown in FIG. 26 where the splash water receiving openings 210'-220', 222'-232', 234'-244', 246'-256', 258'-268', 270'-280', 282'-292', 294'-304' are identical to those of FIG. 19. The overflow water receiving openings, however, are decreased where openings 210-221 communicate with channel 201 (FIG. 27), openings 234-245 communicate with channel 203, openings 258-269 communicate with channel 205 and 282-293 communicate with channel 207.

FIGS. 28, 29 and 30 show another modified arrangement of FIG. 19 where the rows of overflow water receiving openings and the splash/deck water receiving openings in segment 50' in the flow receiving member of coping 13 are spaced in staggered configuration to each other. The row of openings 210-221 for overflow receiving water are in communication with channel 201 (FIG. 2). Row 234-245 communicates with channel 203, row 258-269 with channel 205 and row 282-293 communicates with channel 207. The splash/deck water receiving openings row 222'-232' communicates with channel 202' (FIG. 30), row 246'-256' communicates with channel 204', row 270'-280' communicates with channel 206' and row 294'-304' communicates with channel 208'.

The functions of the modification of FIGS. 19–30 will become obvious from the description of FIGS. 32 to 45.

In the construction of new swimming pools, the surge trench for overflow recirculation water and "deck" drain water is usually located adjacent the swimming pool wall where the width of the trench is limited by the width of the coping. In renovation work, the location of the trench next to the pool is expensive due to the removal, in many instances, of the deck, excavation and the forming of a new trench at the pool perimeter. This, in many instances is not always feasible and is usually very expensive. In the present invention, surge trenches for overflow recirculating water, deck drain water or trenches for combined water may be located at any desirable location, namely under the flow receiving member in new constructions, or in renovation projects, the trench may be constructed at the perimeter of the swimming pool beyond the existing pool deck, the flow receiving member being installed and extending above the existing pool deck between the pool wall and a trench constructed beyond the existing pool deck. Another modified usage of the construction in FIG. 31 is shown in FIG. 32 where the deck system flow-receiving member 13 extends between pool wall 201a and wall 201'. Between wall 201a and 203 surge trench 306' is defined for overflow recirculation water received from the pool and traveling on slope 205 in channel 202. Similarly, between wall 203' and 201' trench 307' is defined receiving splash water from channel 202' via slope 206. Space 308 between wall 203 and 203' may be filled with granular fill or it may be used for a pipe tunnel or other purposes to be explained later.

Another modification of the construction in FIG. 31 is shown in FIG. 33 where sloped surface 205' of the bottom flange of channel 202 and sloped surface 206' of the bottom flange of channel 202' provide respective communication with trench 306 and trench 307. Trench 306 is defined between pool wall 201" and common wall 204 and trench 307 is defined between wall 204 and wall 203. The slope of the upper surface of bottom flange 205' away from pool wall 201" toward trench wall 204 is advisable for pool installations of high flow turnover. Uniform gravity flow in the channel in conjunction with incoming water through the slots in the top, eliminates noise generation, turbulence and the like.

In FIG. 34 another modification of the construction in FIG. 33 is shown here overflow element 13 spans across and rests on the pool wall 201", intermediate trench walls 203, 204,203' and shelf 203a of additional pool deck 14'. Spaces defined between the walls are 309, 306", 307", 310 and are used for pool water recirculation, deck waste, etc. Sloped upper surface on bottom flange 205' of channel 202 provides communication with trench 306" for overflow pool water circulation, while the sloped upper surface on bottom flange 206 of channel 202' provides communication with trench 307" for collecting deck splash water. Space 309 may be used for mechanical equipment, as a pipe tunnel or filled with fill material 203'a as in space 310. In a swimming pool construction of medium circulation flow rate where splash deck water is separately collected and discharged from pool circulating overflow water and where collecting trenches are located remote from the pool wall, the construction of the flow-receiving member is shown in FIG. 36. Therein, channel 202c with inside sloped surfaces 207' and 207" of the bottom flange slope towards a common discharge located in the middle and communicating with surge trench 311 defined between walls 204' and 203'. Deck splash water accumulated in channel 202d and separated from channel 202c by vertical web 200' flows on sloped surface 208' of the bottom flange into collecting trench 307' defined between wall 203' and 203b.

FIG. 35 shows a construction which is the reverse of that in FIG. 36 in that the portion of flow receiving member 13 for receiving splashed deck water is expanded substantially to receive and provide a relatively dry pool deck due to openings in the upper flange as shown in FIG. 35. The bottom flange 208 extends over trench 311 and 307' and rests on dividing wall 203'. Water flow communication between channel 202b and surge trench 307 is accomplished by the upper sloped surface of the bottom flange 208 and similarly the sloped upper surface of flange 207 in channel 202a receiving pool overflow water provides communicating with surge trench 311.

Energy conservation and water recovery are increasingly necessary and must be considered in the construction of new swimming pools and in the renovation of existing swimming pools. Properly designed and selected construction materials and equipment saves energy and can substantially extend the swimming season. As a result of lower energy needs, investments in heat recovery equipment represent continued savings long after the equipment is paid for. Whether the primary consideration is shortage of energy, economics, or both, the advantages of heat conservation and recovery equipment is of great importance. When energy usage is made more efficient profits also increase. The need for conservation and the recovery of energy in swimming pools has resulted in insulated type swimming pool shells as shown in my earlier U.S. Pat. No. 4,051,562 and my applications Ser. Nos. 839,039, 859,253.

Figure 49:
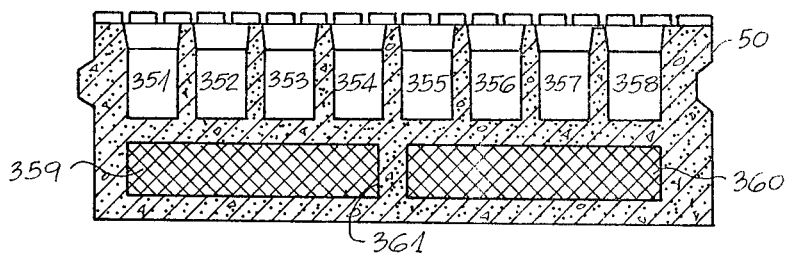
FIG. 49 is a sectional view taken on line 49—49 in FIG. 37.

An insulated type coping/deck system construction of the present invention is described with reference to FIGS. 37 to 44. Competitive types of swimming pools usually are built away from trees and other high rise structures except for swimming pool supporting facilities, which are generally ground level structures. Therefore, swimming pools are exposed to sun most of the time. Usually pools are 25 or 50 meters in length. As an average, such pools consist of 3000 to 5000 square feet of surrounding pool deck area. In the embodiment of the deck system of the invention, the elongated member 13 of segment 50 in FIG. 19, can be of multi channel cross-section as shown in FIG. 37 and transverse cross-section as shown in FIG. 49.

In FIG. 37 a partial multichannel section bottom flange 362 rests on mortar 376 of pool wall 366 and mortar 377 of surge trench wall 367. Space 372 may be filled with granular fill or it may be used as a pipe tunnel, for mechanical equipment, etc. Flange 363 provides a boundary for channel 359 which is filled with rigid insulation 373 enclosed and moisture-sealed by webs 369a and 369. Flange 363 rests on mortar 378 on wall 368 of surge trench 370. Insulation 374' and 374 is provided on the outside of walls 367 and 368 respectively. The relationship between flow receiving channels 351–358 and insulating channels 359 and 360 is best illustrated in FIG. 49. Therein, it is seen that channels 359 and 360 are filled with rigid insulation, and the channels 359 and 360 are separated by web 361 to minimize heat conduction and to increase the structural strength of segment 50. In this embodiment it might be noted that with a properly selected cover surface of high absorption of solar radiation and low emittance for long wave radiation from the flow receiving member, such construction will function as a heat absorber, absorbing short and long wave sun radiation while retaining the absorbed heat in its mass. Accumulated heat is transferred into the recirculating pool water by convection in channels 351–358. Flow communication between the channels 351–358 in FIG. 49 and the surge trench 370 in FIG. 37 is obtained via openings 375. Accumulated hot water 371 in trench 370 may be used to heat the pool or the heat may be exchanged or extracted by a heat pump and used for other means, such as, hot water supply for showers, heating or cooling the bathhouse, etc. An insulated type of deck system member where separation of overflow pool water and splash water is required, may be accomplished by the construction shown in FIGS. 38, 39 and 40 and the modified embodiment of FIG. 37. In the embodiment of FIGS. 38 and 39 the upper flange 380 of the flow receiving member 13 is provided with slotted and solid portions as described in relation to FIG. 22.

Figure 40:
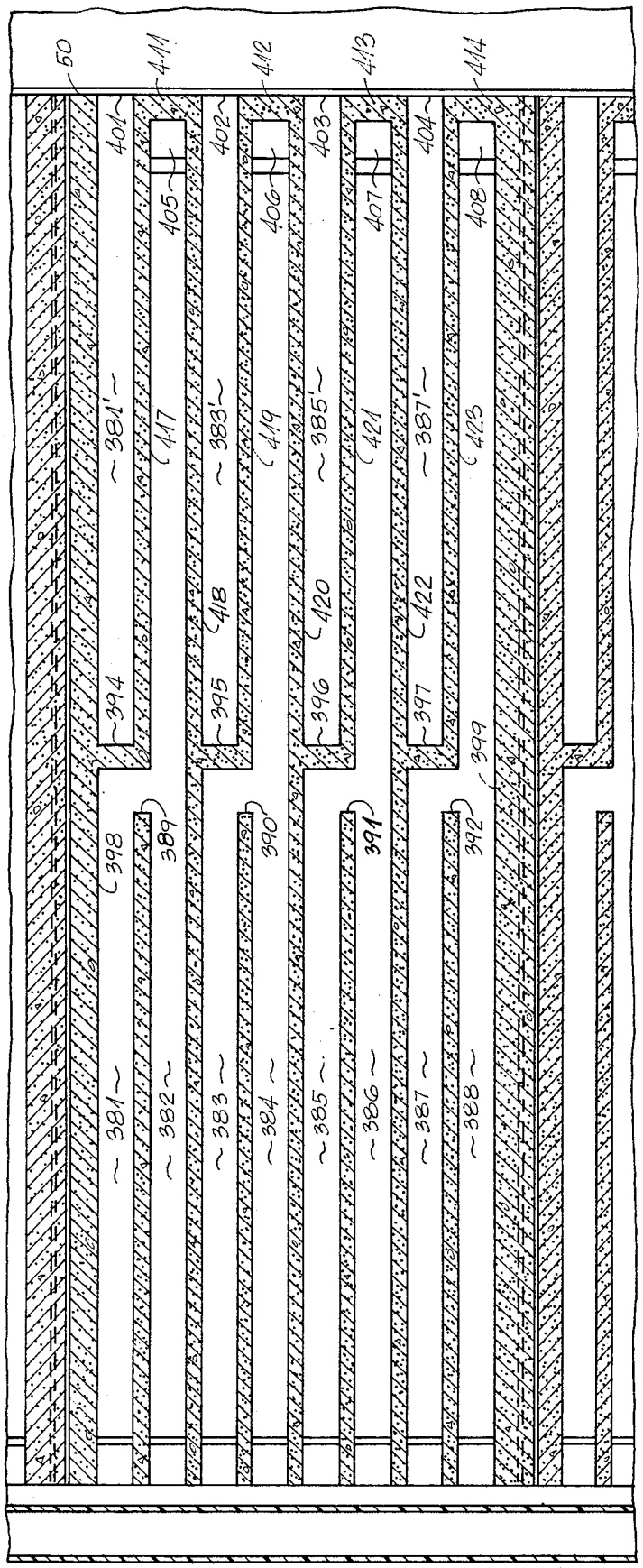
FIG. 40 is a sectional view taken on line 40—40 in FIG. 38.

As best illustrated in FIG. 40, segment 50 of the flow receiving member 13 comprises interior longitudinal dividing webs 417, 418, 419, 420, 421, 422 and 423 between main side webs 398 and 399 of segment 50. The webs define channels 381, 382, 383, 384, 385, 386 and 388. The channels 381, 383, 385, 387 are divided by perpendicular webs 394, 395, 396 and 397 to form channels 881', 383', 385', 387' open to the exterior at 401–404 respectively. Additionally, communication between channels 381 and 382 is made by openings 389 in web 417, between channel 383 and 384 by opening 390 in web 419, between channel 385 and 386 by opening 391 in web 421 and between channel 387 and 388 by openings 392 in web 423. Channels 382, 384, 386 and 388 are enclosed at the ends by webs 411–414 and openings 405–408 are provided in bottom flang 379 as best illustrated in FIG. 38.

Referring now to FIG. 38, overflow water in channel 386 flows on the sloped surface of bottom flange 379 to trench 400 between walls 409 and 409' via opening 407 and opening 391 in web 421 permits water to enter channel 386 from channel 385 as shown in FIG. 40.

In FIG. 39 channels 383 and 383' are divided by web 395 and the slotted upper flange 13 receives overflow swimming pool water for flow to channel 383 and deck splash water for flow to channel 383'. Discharge of flow from channel 383 to channel 384 is possible by openings 390 in web 419 as shown in FIG. 40. Splash deck water is discharged from channel 383' via sloped opening 402 in bottom flange 379' to the exterior of trench 400 at wall 409 to flow through gravel 416 into drain pipe 415. Pipe 415 is connected to discharge the flow to a storm sewer (not shown).

Figure 51:
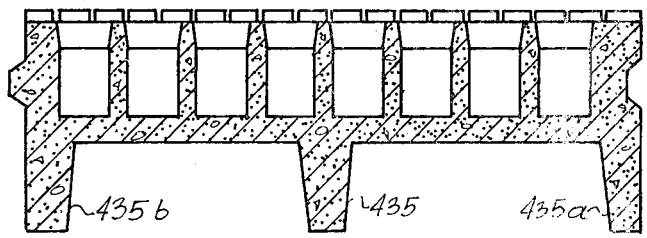
FIG. 51 is a sectional view taken on line 51—51 in FIG. 41.

Another modified construction is shown in FIG. 41. Therein is shown a construction of the flow receiving member 13 whose upper perforated flange 426 and 426' permits pool overflow water to enter channel 430 and the flow via the upper sloped surface of flange 427 and the slope surface 433 to a channel 431' and then via slope surface 433' into trench 440. Similarly, splash deck water entering channel 430' is discharged via the sloped surface 427' and slope surface 436 into trench 441. Channel 431 is filled with insulation 432 and sealed by web 434. Channels 430 and 430' in the upper portion of the flow member are separated by vertical web 429 and lower channel 431' and web 435 are separated by web 429'. Deck system member 13 is set on mortar 444, 445, 446 and 447 at the top of walls 437, 438, 439, 443 respectively. The deck system construction of this type is recommended where greater structural requirements have to be met due to unsupported spans between supports vs. live load. As shown in FIG. 51 in addition to vertical member 435 there are additional end members 435a and 435b.

In the embodiment of FIG. 42, the flow receiving member comprises a two-part construction including stationary part 13b similar to FIG. 41 and removable part 13a. The stationary part 13b receives overflow water and is supported on the bottom flange 455 and 455' of pool wall 456 with mortar bed 463 and trench wall 457 and mortar bed 464 to form space 465. The removable part 13a rests at one end on a horizontal surface 452 of vertical web 453 of channel 450 and at its opposite end on wall 459 and a mortar bed 461 which is built-up to the required elevation. Splash deck water is received by removable member 13a where it flows into channel 460 along the sloped upper surface of bottom flange 462 and into trench 466' via opening 467. Sections 13b and 13a are joined together and form a space 454 between vertical edge 451 of web 453 in channel 450 in perpendicular relation to the vertical web 461 of channel 460 in section 13a. The removable section 13a extends over trench 466' and trench 466 which store overflow swimming pool water, the trenches being separated by vertical partition wall 458. Rising water in trench 466 may be discharged into trench 466' by flowing over the top of the wall 458 and then further discharged to waste.

Figure 43:
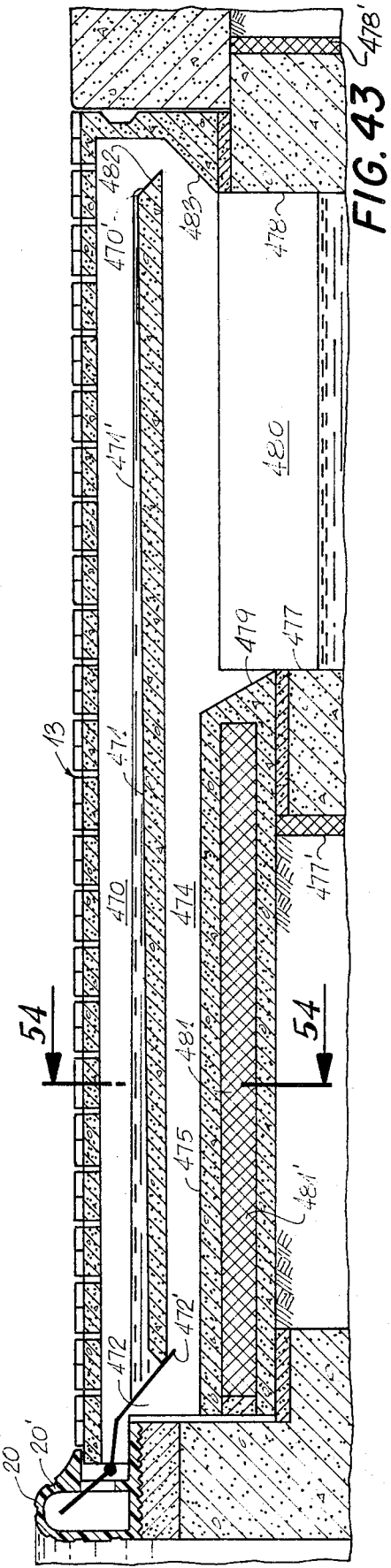
FIG. 43 is a sectional view of another modification of the structure in FIG. 31.

Heating of the swimming pool water using the deck system of the invention will not be complete without satisfying another object of this invention which is the energy conservation accomplished by the construction shown in FIG. 43. In this regard a mandatory requirement of swimming pools is to circulate swimming pool water constantly regardless of pool activity to provide sanitary conditions such as filtration, chlorination, etc.

Swimming pool water overflowing element 20 in FIG. 43 enters channel 470 through the slots in the upper flange 13. The bottom flange of channel 470 is sloped towards overflow element 20 and is provided with openings 482 and 472 at end each. A manually controlled lever 472' is mounted in opening 472. Lever 472' may be moved between open and closed positions by use of a tool inserted through openings 20' in overflow element 20. When the openings 472 is open a conservation cycle is effected in which the water does not undergo heating or cooling. In closed position of opening 472 constituting a heating cycle, overflow water accumulated in channel 470 is heated until it overflows high point 470' of opening 482 and then travels via slope surface 483 into trench 480 located threbelow between walls 477 and 478 insulated with rigid insulation 477' and 478' respectively. The accumulated body of water 471' in channel 470 absorbs heat from the receiving member by convection and heat transfer is further increased by increasing the surface area of the flow receiving member due to increased water volume.

In the open position of lever 472', the conservation cycle, heated overflow swimming pool water entering channel 470 is directed by the slope surface of flange 471 to opening 472 and enters channel 474 and surge trench 480 via the sloped surfaces of flanges 475 and 479.

Bottom flange 475 of channel 474 is insulated with rigid insulation 481' in channel 481. A short circuit of the swimming pool water in the flow receiving member contributes to energy conservation and is recommended on cloudy days, overnight circulation, or when ambiant temperature drops below pool water temperature. Overheating of swimming pools is known and is common. Cooling usually is required and is accomplished by pumping pool water through absorbers, chillers, etc.

The construction in FIG. 44 permits heating or cooling of the swimming pool water by solar energy without the use of ordinary solar collectors, conventional heating systems or other special mechanical devices. FIG. 44 shows a modified construction of FIG. 43. "The heating cycle" in FIG. 44 is identical in all respects as explained in relation to FIG. 43. FIG. 44 shows a modification of deck system 13 which consists of an intermidiate sealed channel 482 filled with insulation 482' located below upper channel 470 and above lower channel 490. Manual lever 472' is normally in an open position permitting water to pass through opening 472 and enter channel 490. The lever 472' may be pneumatically, hydraulically or thermostatically controlled for an automatic operation. The bottom flange of channel 490 is in contact with fill material (soil) 484 in space 485 between pool wall 486 and trench wall 487. Overflow pool water is discharged by gravity flow to trench 480 via spring-loaded insulated baffle 489'.

Heat transfer from the swimming pool water flowing in channel 490 will take place by convection between the fluid and the surface of the channel body and further by conduction through bottom flange 483 to the cooler body of soil 484 in space 485. This serves as a "cooling cycle" for the recycle water. To minimize heat transfer from or to surge trench 480, insulated inlet baffles 489' and 489 are provided. Pool and trench walls 486, 487 and 488 are insulated with insulation 486', 487' and 488' respectively. Heating or cooling performance of the swimming pool water may be increased by providing conductive coating inside channels 470, 490 and on the exterior surface 473 of flange 483. The "conservation cycle", the "heating cycle" as in FIG. 43 and the "cooling cycle" in FIG. 44 may be combined into one unit by providing additional channels in vertical relationship to channels 470, 482, 490 as in FIG. 44 and additional controls. Surge trench capacity is calculated on the bases of requirements of health departments and is generally established as requiring 1 U.S. gal. surge capacity per 1 sq. ft. of swimming pool area. In accordance with the present invention conventional surge trenches may be eliminated and surge capacity maintained within the pool deck system by virtue of the volumetric capacity of the deck system. The embodiment of FIG. 45 comprises overflow element coping section 13 for receiving swimming pool overflow water and section 13" for receiving deck water. Section 13 and 13" are respectively provided with groove 491 and tongue 492 and are set on a mortar bed 499 of wall 493 separating trenches 494 and 495. Deck section 13" has a groove 496 at its other end for joining with additional sections that may be used for special purposes e.g. additional drainage, or HVAC supply or return, which will be explained later.

The interior surfaces of bottom flanges 497 and 498 of elements 13 and 13" are sloped towards discharge openings to insure complete drainage as shown by the arrows. Additional pitch may be effected by raising the elevation of the mortar 499 on top of wall 493. This will change the inclination and appearance of section 13 with pitch towards overflow element 20 and further result in change of performance and flow behavior. Section 13" may be set in a level position or pitched towards concrete deck 14. The point of joining of sections 13 and 13" will become the high point and will provide for separation between the overflow swimming pool water and the splash deck water. Additional members 13" may be provided for deck extension with additional trenches for other usage. In indoor-type swimming pools, comfort for swimmers and spectators is provided by heating, air-conditioning or ventilation systems. Additionally, humidity control has to be maintained for comfort conditions. To remove large quantities of moisture in the air, all-air systems are usually required. A combination of supply air ducts and return-/exhaust air ducts are required and are located at ceiling plenum and at the pool perimeter under the pool deck. Because of the moist, corrosive, pool atmosphere, air ducts and duct hardware must be constructed of non-corrosive materials. Supply/return air ducts located at the pool perimeter under the pool deck are insulated and connected to registers flush mounted at the pool deck. The pitch of the ducts has to be maintained with drain connections at the low points. A construction of this type is very expensive and complex, requires skilled labor, heavy machinery for duct excavation, backfilling and compaction, and in most of cases, space is limited. A pool deck system for pool water circulation incorporated with supply/return air distribution of inexpensive design is shown in FIG. 46. Element 528 of the flow receiving member is similar in all respects to element 13 of FIG. 31 described previously except for the surface veneer. The surface veneer comprises topping material 529 made of PVC with non-skid top and bottom sections welded together in grid form. The topping material is known in the art and is available in the form of interlocking tiles as manufactured by Kendall Plastics Inc. available under the name "Decktile", "Duckboard". The topping material 529 is attached to the flange 544 of element 524 by inserting bottom sections 529' is grooves 528' in the upper flange 544. Element 528 is inserted in overflow element 20 and is installed on the top of swimming pool wall 543 and extends to building wall 534 resting on saddle 545. Wall 535 between pool wall 543 and 534 provides space 530 for a reservoir 546 of pool overflow water and space 531 for exhaust/return air. Spaces 530 and 531 are lined with liner 536 and insulated with rigid insulation 537 as described above. Bottom flange 541 of the flow receiving member comprises a height-adjustable web 532 defining channels 547 and 548. The function of the flow receiving member has been described previously, however, because of unique flow patterns of water or air, the displacement characteristics may also be combined with a HVAC system. In conjunction with supply air ducts at the ceiling plenum, space 531 is used as a return duct and as a trench for deck splash water in accordance with the number and size of orifices 542 in upper flange 528 as described and shown in FIGS. 19–28. This will result in optimum air circulation within the building enclosure of the swimming pool.

In various designs, a supply and exhaust/return air duct may be required and as an example, space 531 is divided by partition 540 to provide exhaust/return air duct 531$a$ and supply air duct 531$b$. Exhaust/return air may be drawn from the building via slots 542, channel 547, the space above water level 546 to duct 531$a$ via space 538 between wall 535 and the bottom of flange 541. Separation of channel 547 and 548 is made by extending web 532 to the full height as shown at 533, and the web may be relocated as required. Supply air duct 531b will discharge supply air via space 539 into channel 548 and slots 542' to the building interior. Slots 542' may be modified in size, number and direction as, for example, shown at 542" for building wall "wash" especially at wall glazed areas.

Figure 47:
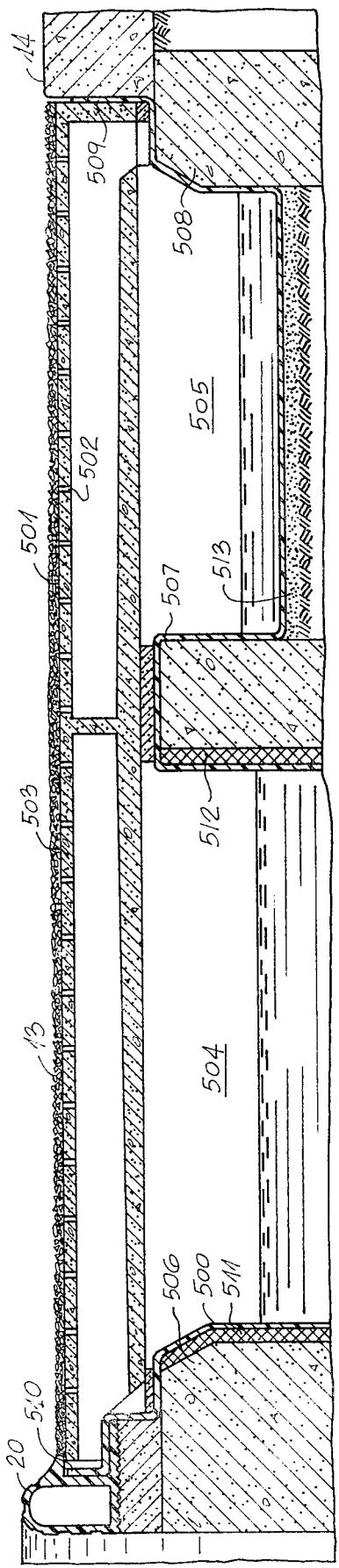
FIG. 47 is a sectional view of a modification of the structure in FIG. 46.

The construction of swimming pool trenches for receiving and storing swimming pool recirculation water is known in the art as described in U.S. Pat. No. 3,585,656 (Costello). These trenches are monoliticly poured as a reinforced structural wall with the swimming pool wall or they are built as a second wall "pool within the pool" on a common foundation. In either case such construction is very expensive as the forming of the walls requires a double quantity of forming materials during the construction, additional reinforcing steel, concrete, skilled labor, excavation and time. The construction of swimming pools trenches remotely located from the swimming pool wall with the use of the coping and deck systems of the present invention will result in a greater saving of labor, materials and time, because of their non-structural requirements. Moreover, additional savings can be made using the construction described in FIGS. 46–48. In FIG. 47 deck system 13 is similar in all respects to that in FIG. 31 described previously except for surface topping veneer 501. The veneer 501 comprises coarse sand base material bonded with epoxy resin in a controlled ratio to provide structural topping. As a result a porous non-skid surface is obtained in a variety of colors available with unique water flow-through characteristics. Such material is currently available and known in the art. Because of the unique porosity characteristics, orifices in the topping are not required. The slots 502 in the upper flange 503 of system 13 convey the water into the channels. Spaces 504 and 505 are formed by structural pool wall 506 and non-structural walls 507 and 508. Walls 506, 507 and 508 are independent from each other and don't require a common foundation. Non-structural walls 507 and 508 may be built of concrete, concrete block or other prefabricated members of required height ad they don't have to be watertight.

Sand bed 513 is placed at the bottom of space 505 and similarly at the bottom of space 504 (not shown). Additionally, in space 504 rigid insullation 511 and 512 is applied to walls 506 and 507 and placed over the sand bed at the bottom between walls (not shown). In FIG. 47 there is seen a vinyl liner 500 installed on overflow member 20 beginning at point 510 to overlay the rigid insulation of wall 506, bottom space, on both sides of wall 507, over sannd bed 513, wall 508 and is fastened between deck system 13 and pool concrete deck 14 at point 509.

The conventional renovation of swimming pool overflow systems and pool decks varies considerably in accordance with the type of overflow installed. Some require the surge trench to be incorporated into the pool wall, others result in replacement of overflow only. However, additional piping headers have to be provided at the pool perimeter. In all cases, excavation is required and the pool decks have to be replaced. Renovation of this type is very expensive, time consuming and it is necessary to use machinery and skilled labor.

Figure 48:
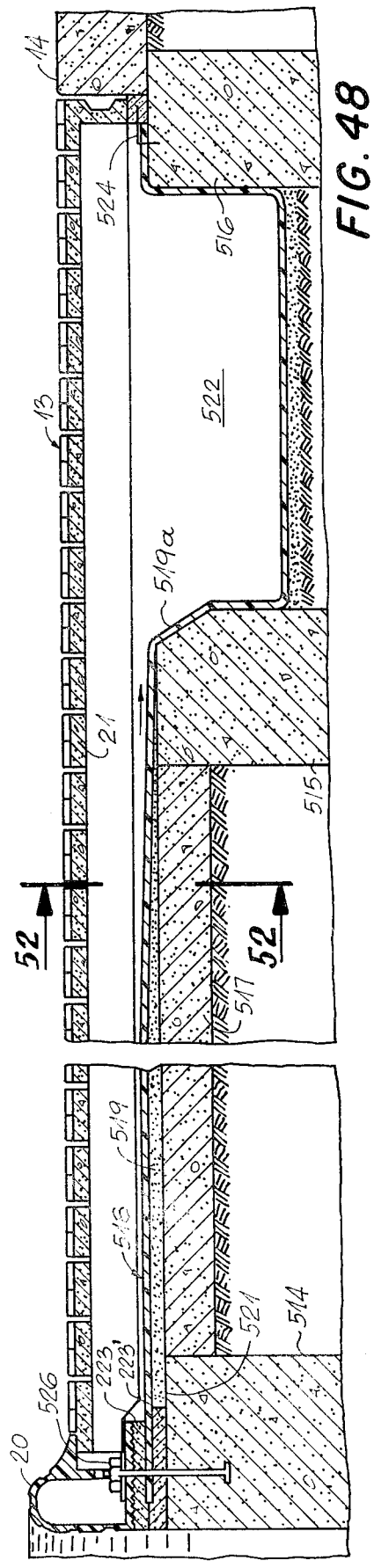
FIG. 48 is a sectional view of another modified construction of the swimming pool deck system and surge trench construction shown in FIG. 46.

A modified deck system and pool overflow surge trench construction for the inexpensive renovation of a swimming pool overflow and deck system in accordance with present invention is shown in FIG. 48. The concrete construction of swimming pools to be renovated conventionally consists of overflow systems usually of gutter type, recess gutter, rollout or the like and a concrete deck at the pool permiter. The overflow systems usually are built above the pool deck or therebelow.

In accordance with the present invention, the existing pool overflow system is removed or built-up to the same elevation as the pool deck and is shown in FIG. 48 on the pool wall 514 as 521. The existing pool deck 517 does not have to be removed regardless of condition. Anchor bolts 526 are installed in the pool wall 521 and grout 223' is provided for leveling of the top of wall 514. Trench 522 is excavated beyond the existing pool deck 517. The width and depth of the trench will vary in accordance with the size of the renovated pool and will have to be calculated accordingly.

By way of one example, a 25 meter×45 feet swimming pool will require a trench of approximately 1 FT width×2 FT depth at the pool perimeter. A trench of this size may be dug in the earth without additional walls, contrary to FIG. 48. Walls 515 and 516 shown in FIG. 48 are independant non-structural walls without a common foundation and define space 522. The pool deck 517 is usually uneven and has cracks and settlements in between. To provide an even surface with a slope 518 into the trench, a layer of sand 519 is installed and vinyl liner 519a is bonded to the grout 223' on top of the wall 514 and overflow element 20 is installed. The remaining space is filled with grout 223. The other end of the liner is fastened to the top of wall 516 and 524 and flow receiving member 21 is installed. Additional deck 14 may be installed as shown. A construction of this type is very simple in installation, does not require removal of the existing pool deck and can be carried out without skilled labor at a low cost and with no requirements for an additional pool deck. A construction of this type may be also used for new pool construction.

According to another example, the swimming pool of the size described in the first example, constructed with a deck system at the pool perimeter in accordance with the present invention comprising members of 10 FT length will provide 5000 gallons storage capacity within the body of the deck system satisfying Health Department code requirements of 1 U.S. gallon storage capacity per 1 square foot of pool area.

A trench of minimum size may be constructed similar to that in the first example and the trench serves only for the conveying of water from individual deck system members to the point of connection with pumping and filtration equipment. Further, the trench may be eliminated by modifying the deck system members by providing communication of water flow between deck system members or by providing pipe connections from each member to the common pipe manifold.

The storage capability of the deck system, the elimination of surge trench construction and the elimination of an additional pool deck results in further cost reduction, and the saving of time, materials and labor.

Figure 50:
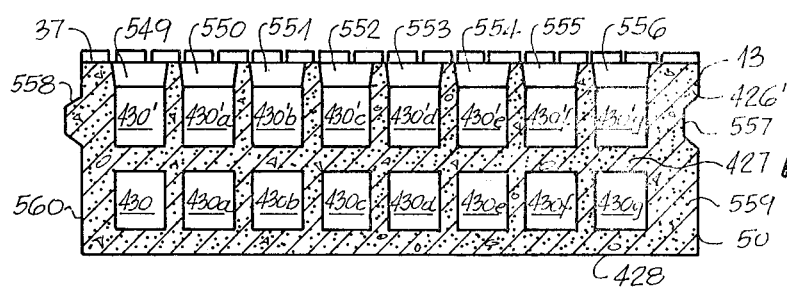
FIG. 50 is a sectional view taken on line 50—50 in FIG. 41.

In FIG. 50, a segment 50 of the lfow receiving member 21 as shown in FIG. 41 is provided with slots 549–556 in upper flange 426' communicating with channels 430'–430'g. The flow receiving member includes intermediate flange 427 and channels 430–430g enclosed by bottom flange 428 and side vertical members 559 and 560. The members 559 and 560 are provided with tongue 558 and groove 557 respectively. The upper surface of flange 426' is veneered with ceramic tile 37.

Figure 53:
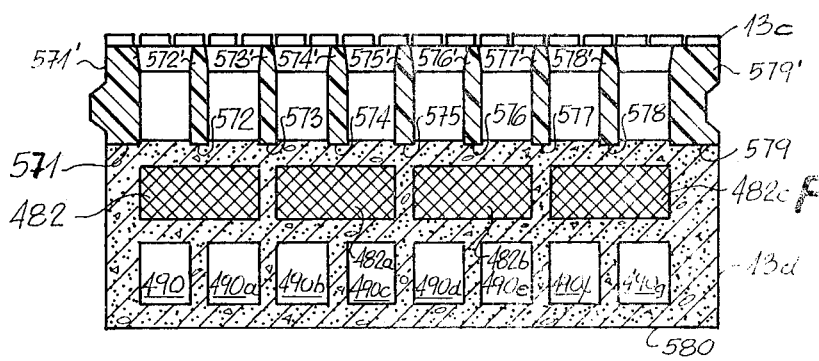
FIG. 53 is a sectional view taken on line 53—53 in FIG. 44.
Figure 54:
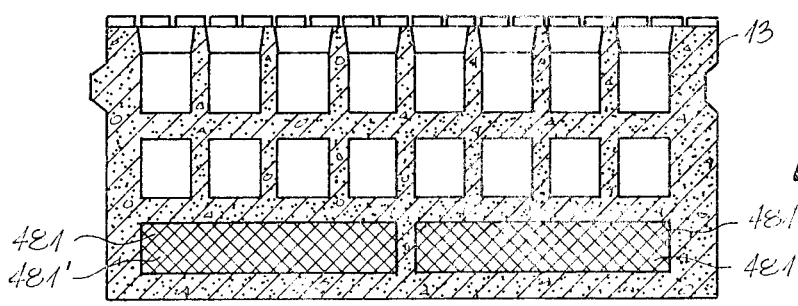
FIG. 54 is a sectional view taken on line 54—54 in FIG. 43.

The construction in FIG. 52 is shown in FIG. 48. The construction of member 13c in FIG. 52 is identical to the corresponding member in FIGS. 20–21 except for the omission of the bottom flange connecting exterior vertical members 569 and 570 and enclosing channels 561–568. Usage of the construction in FIG. 52 is further shown in FIG. 53. Therein is seen a two-part construction, where upper portion 13c is made of thermosetting or thermoplastic material, for example, a graphite composite for greater heat absorption. Vertical members 571'–579' of portion 13c are engaged in recesses 571–579 in the upper flange of element 13d. Element 13d is made of concrete and bonded with the adhesive at recess 571–579 to the vertical members of portion 13c. Channels 482, 482a–482c in element 13d are filled with rigid insulation and channels 490, 490a–490g also in element 13d are used for pool water circulation for cooling purposes. Bottom flange 580 of element 13d is shown with a flat surface, however by providing vertical members, the contact surface area with the earth may be substantially increased. In FIG. 54 the system 13 illustrated in FIG. 43 is shown in transverse section. In FIG. 54 can be seen insulating channels 481 and 481a respectively filled with rigid insulation 481' and 481'a. The insulating channels are horizontally elongated for greater insulating value.

FIG. 55 shows an arrangement in which two pools are at different water level elevations and a combination coping and deck system 13B" is disposed therebetween. The basic construction and flow characteristics of upper part 600a and lower part 600b is the same as that as described previous for the other embodiments. The upper part 600a is separated by vertical member 601 from lower part 600b to accomodate the difference of water level elevations 11a and 11b. Overflow water from both pools discharges by gravity flow to common surge trench 602 for further circulation.

A construction of this type can be combined with the embodiment of FIG. 40 and an additional trench may provide separate collection and discharge of deck splash water.

Figure 56:
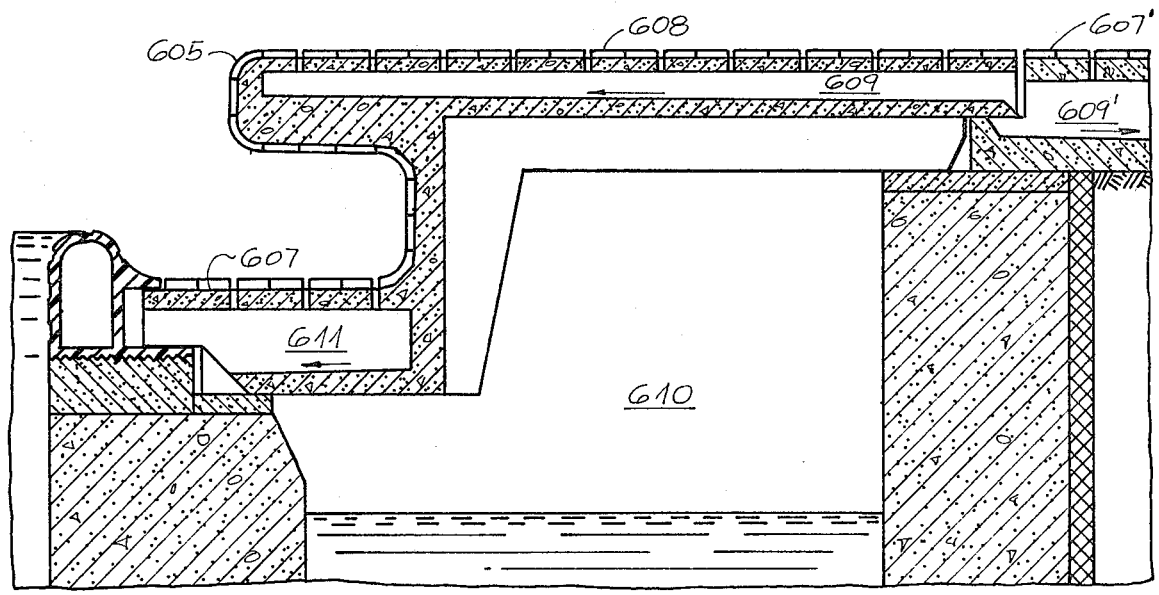
FIG. 56 is a sectional view of a modified coping.
Figure 57:
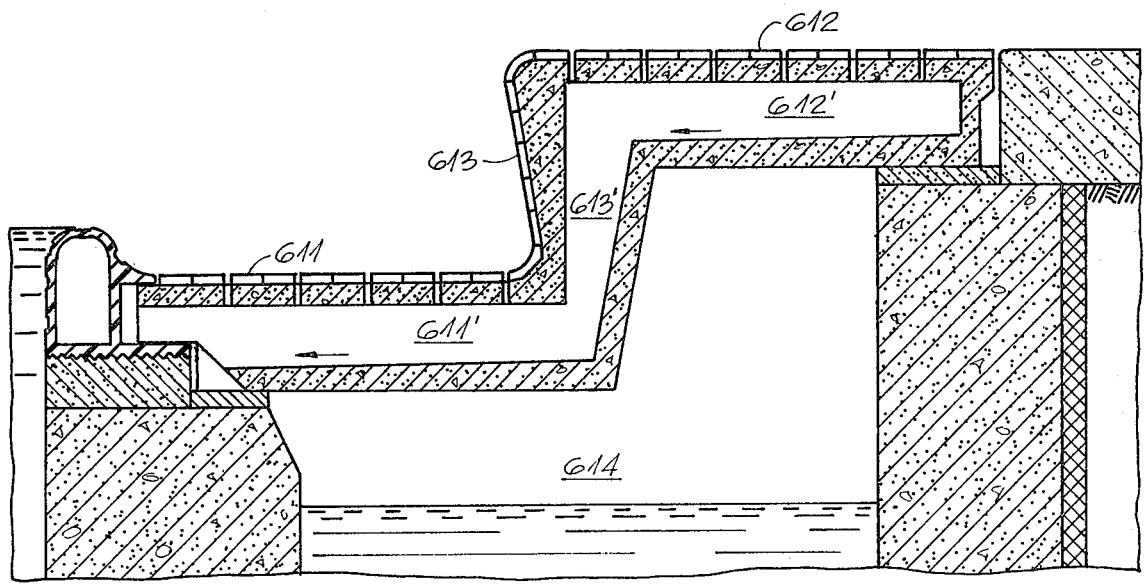
FIG. 57 is a sectional view of another modified coping.

FIG. 56 shows a construction which is a modified gutter-type coping 605 comprising lower portion 607 with inside channel 611 for discharging overflow pool water into trench 610 and upper portion 608 with interior channel 609 discharging splash water to extended deck system member 607. The member 607 has an inside channel 609' for receiving water from channel 609 and further receiving deck splash water via openings in its own upper flange, the combined water being discharged to a separate trench (not shown). FIG 57 shows a coping similar to that in FIG. 56 and referred to as a rollout-type coping wherein upper portion 612 is raised above lower portion 611 by step 613 and interior channels 611', 612', and 613' are connected to each other for conveying overflow pool water and splash deck water to trench 614 therebelow.

Figure 58:
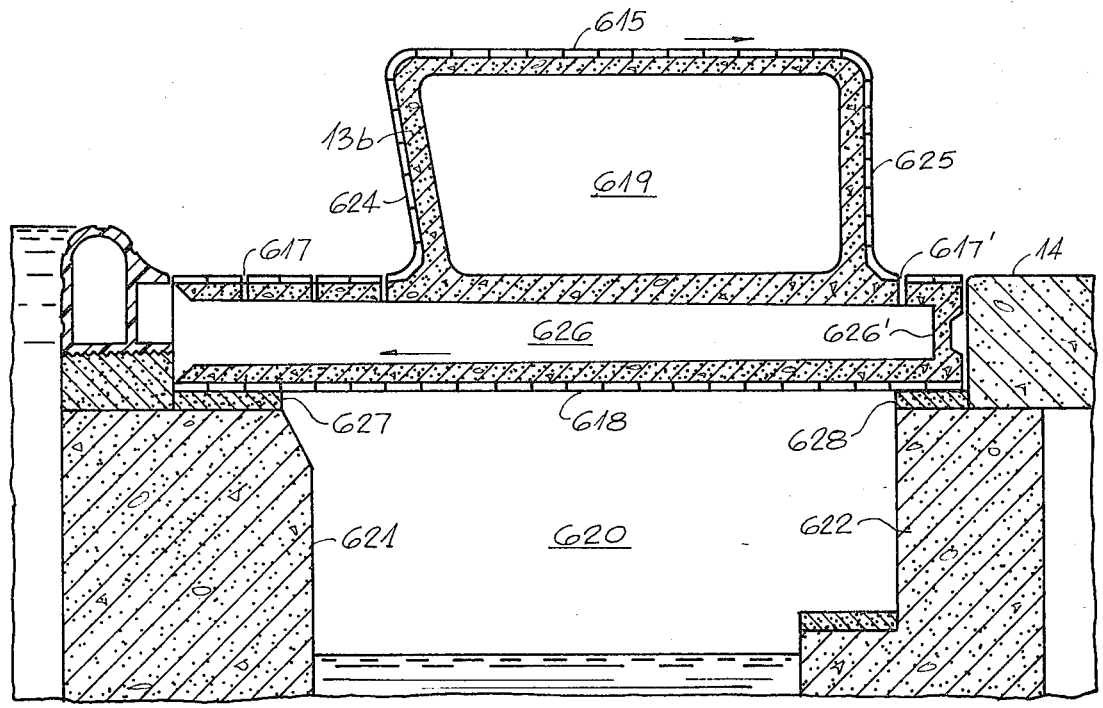
FIG. 58 is a sectional view of a reversible coping in one position of use.

In many instances a gutter-type or rollout-type coping is preferred over a deck level-type coping depending on different activity events. FIG. 58 shows a removable rollout-type coping 13b comprising flow-receiving slotted flange 617, 617', lower flange 618 and end web 626' defining channel 626. An upper solid flange 615 and vertical flanges 624 and 625 define space 619 therebetween. Member 13b rests on mortar beds 627 on wall 621 and 628 on wall 622, said beds being built-up and cured to required elevation. Trench 620 is defined between walls 621 and 622.

The construction of the flow receiving slotted flange 617, 617' and lower flange 618 with channel 626 therebetween and the internal configuration thereof is similar in construction to the embodiments in FIGS. 10 and 11 and requires no elaboration hereat.

Figure 59:
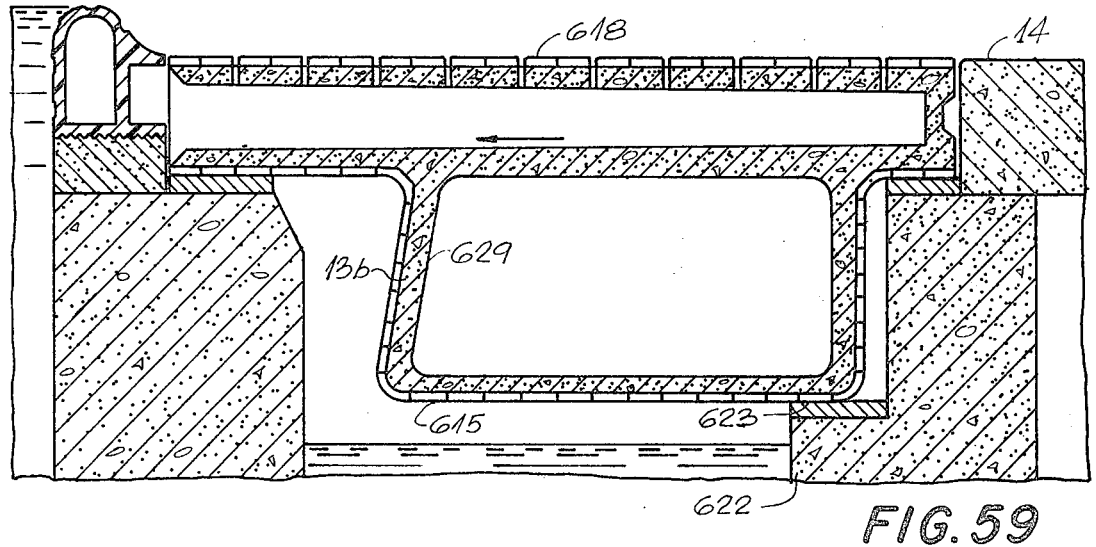
FIG. 59 shows the coping of FIG. 58 in inverted position in another position of use.

In FIG. 59 the rollout-type coping of FIG. 58 is shown in reversed position where flange 618 becomes a deck level-type coping at the same elevation of concrete deck 14. Addiitionally, flange 615 may be supported on shelf 623 of wall 622. The roll-out type configuration 629 may be changed to various other coping constructions in conjunction with the deck level coping as in FIG. 59 and various combinations are possible, for example, roll-out-type to gutter-type, gutter-type to deck level-type, etc. Starting blocks used for competitive swimming may be used and accomodated similarly.

Although the invention has been described in conjunction with numerous embodiments thereof, it will become apparent to those skilled in the art that many modifications and variations can be made within the scope of the invention as defined in the attached claims.

What is claimed is:

1. Collection apparatus for water from a swimming pool having a bounding side wall, said apparatus comprising an overflow member at the side wall of the pool for flow of pool water thereover, and flow receiving means extending outwardly from the overflow member for receiving overflow water therefrom, said flow receiving means comprising a hollow member including upper and lower flanges and a longitudinal channel between said flanges, said upper flange having openings therein for passage of water through said upper flange into said channel, a surge tank at a level below said channel, and means providing communication between said channel and said surge tank for flow of water from said channel to said surge tank.

2. Apparatus as claimed in claim 1 wherein said lower flange has an inclined upper surface on which water in said channel flows to said means which provides communication with the surge tank.

3. Apparatus as claimed in claim 2 wherein said inclined surface extends from one end to the other of the channel.

4. Apparatus as claimed in claim 2 wherein said upper surface of the lower flange is inclined in opposite directions from a substantially central location on said lower flange.

5. Apparatus as claimed in claim 1 comprising tiles on said upper flange covering the extent thereof outside said openings.

6. Apparatus as claimed in claim 5 wherein a plurality of said hollow members are arranged adjacent one another to form said flow receiving means, said tiles having marking means thereon, at least one of said hollow members being removable and invertable, said at least one hollow member having tiles on the lower flange with marking means thereon so that when the hollow member is inverted the marking means on the lower flange is visible.

7. Apparatus as claimed in claim 6 wherein said flange is of Greek-key configuration in cross-section to form a plurality of said longitudinal channels which open alternately upwardly and downwardly.

8. Apparatus as claimed in claim 1 comprising anchor means secured to said overflow member and facing into the pool, said anchor means including a ring-shaped member.

9. Apparatus as claimed in claim 1 comprising a second surge tank adjacent the first said surge tank, said hollow member including a divider therein to form two separate channel sections from said longitudinal channel, said separate channel sections being in communication with a respective one of said surge tanks.

10. Apparatus as claimed in claim 9 wherein the upper surfaces of the lower flange in the two separate channel sections are inclined towards one another so that water flow in the separate channels travels towards the divider.

11. Apparatus as claimed in claim 9 wherein one of said channel sections is positioned closer to the overflow member for receiving overflow water from the pool and the other of the channel sections is positioned remote from the overflow member for receiving splash water.

12. Apparatus as claimed in clam 11 wherein said flow receiving means comprises first and second members each provided with a respective one of said channel sections, and interlocking means connecting said first and second members together.

13. Apparatus as claimed in claim 12 wherein the surge tank associated with the member whose channel section is remote from the overflow member is partitioned to form one part communicating with ambient atmosphere via said channel section and the openings in said flow receiving member and a second part separated from the other surge tank closer to the overflow member by a wall over which can flow from said other surge tank to said other part of the first surge tank.

14. Apparatus as claimed in claim 1 comprising insulation means in said flow receiving means for opposing heat transfer from said surge tank.

15. Apparatus as claimed in claim 1 wherein said flow receiving means is a monolithic body.

16. Apparatus as claimed in claim 1 wherein said openings are in the form of slots arranged in rows extending from said overflow member perpendicular to said side wall.

17. Apparatus as claimed in claim 16 comprising dividing webs in said hollow body forming respective sub-divided flow chanels each associated with a respective row of slots.

18. Apparatus as claimed in claim 1 wherein for pools of polygon shape having corners, said flow receiving means further comprises a hollow corner member including upper and lower flanges, said upper flange having openings therein, said hollow corner member including webs defining a plurality of first channels for receiving water via selected ones of said openings in the upper flange, and a plurality of second channels isolated from said first channels and receiving water via other said openings in the upper flange, said second channels communicating with said surge trench, said first and second channels extending at an angle to one another.

19. Apparatus as claimed in claim 18 wherein the second channels are arranged in two groups extending at right angles to one another.

20. Apparatus as claimed in claim 1 wherein said flow receiving member is provided with a second isolated channel and with insulation means in said second channel.

21. Apparatus as claimed in claim 1 wherein said channel has a plurality of sections defining first and second paths of travel for water received from said openings to said surge trench control means for selecting the first and second paths of travel.

22. Apparatus as claimed in claim 21 comprising means along one of said paths of travel for heat exchange with the water in said one path for adjusting the temperature of the water.

23. Apparatus as claimed in claim 1 wherein said flow receiving member has a plurality of tiers with respective channels, the channel of the upper tier being the channel which receives the flow water, at least one of the other of the channels containing insulation means.

24. Apparatus as claimed in claim 1 wherein sad flow receiving member includes a section which is invertable to form first and second surface configurations for said flow receiving member.

25. Apparatus as claimed in claim 24 wherein said first and second configurations respectively comprise a flat deck and a deck with a projection thereon.

26. Apparatus as claimed in claim 1 wherein said flow receiving member includes portions at different levels forming a step between the levels.

27. Apparatus as claimed in claim 1 comprising a vinyl liner installed beneath said overflow member and said hollow member of the flow receiving means and covering the interior of said surge tank.

28. Apparatus as claimed in claim 1 wherein said flow receiving member is composed of a composite material.

29. Apparatus as claimed in claim 1 wherein said flow receiving means comprises a plurality of successive hollow members.

30. Apparatus as claimed in claim 29 comprising means connecting said hollow members for conveying water successively from one to the next.

31. Apparatus as claimed in claim 1 wherein said upper flange of the hollow member has a flat outer surface which is level.

32. Apparatus as claimed in claim 1 comprising means associated with said overflow member for producing an illuminating effect at the edge of the pool.

33. Apparatus as claimed in claim 32 wherein said overflow member is hollow and transparent and said illuminating means comprises an internal coating on said hollow member.

* * * * *